(12) United States Patent
Gerbino

(10) Patent No.: US 7,475,847 B2
(45) Date of Patent: Jan. 13, 2009

(54) RETRACTABLE LIFTING BLADES FOR AIRCRAFT

(76) Inventor: Allen J. Gerbino, 4235 Donald Douglas Dr., Long Beach, CA (US) 90808

( * ) Notice: Subject to any disclaimer, the term of this patent is extended or adjusted under 35 U.S.C. 154(b) by 564 days.

(21) Appl. No.: 11/317,855

(22) Filed: Dec. 22, 2005

(65) Prior Publication Data

US 2006/0237581 A1 Oct. 26, 2006

Related U.S. Application Data

(63) Continuation-in-part of application No. 10/657,838, filed on Sep. 9, 2003, now Pat. No. 7,004,427.

(60) Provisional application No. 60/409,582, filed on Sep. 9, 2002.

(51) Int. Cl.
*B64C 27/52* (2006.01)

(52) U.S. Cl. .................................. 244/17.25

(58) Field of Classification Search .............. 244/17.11, 244/17.25; 416/87
See application file for complete search history.

(56) References Cited

U.S. PATENT DOCUMENTS

| | | | |
|---|---|---|---|
| 578,509 A | 3/1897 | Drayton | |
| 2,464,285 A | 3/1949 | Andrews | |
| 2,950,074 A | 8/1960 | Apostolescu | |
| 3,128,829 A | 4/1964 | Young | |
| 3,282,534 A | 11/1966 | Serriades | |
| 3,375,997 A | 4/1968 | Gist, Jr. | |
| 3,381,474 A | 5/1968 | Gist, Jr. | |
| 3,606,571 A | 9/1971 | Wood | |
| 3,763,835 A | 10/1973 | Miller et al. | |
| 3,768,923 A * | 10/1973 | Fradenburgh | 416/89 |
| 3,814,351 A | 6/1974 | Bielawa | |
| 3,933,324 A | 1/1976 | Ostrowski | |
| 4,730,795 A | 3/1988 | David | |
| 4,913,376 A | 4/1990 | Black | |
| 5,735,670 A | 4/1998 | Moffitt et al. | |
| 5,791,592 A | 8/1998 | Nolan et al. | |
| 6,062,508 A | 5/2000 | Black | |
| 6,371,681 B1 * | 4/2002 | Covington et al. | 403/158 |
| 7,004,427 B2 | 2/2006 | Gerbino | |

OTHER PUBLICATIONS

International Search Report for International Application No. PCT/US03/28156 Dated Dec. 28, 2004, 2 page(s).

* cited by examiner

*Primary Examiner*—Tien Dinh
(74) *Attorney, Agent, or Firm*—Greenberg Traurig LLP

(57) ABSTRACT

A rotor blade assembly for providing vertical lift to an aircraft, having a rotor head and a plurality of blades, with each blade attached to a mechanism such as a cam surface, whereby movement of the mechanism causes the radial distance between the distal tip of the attached blade and the center of the rotor head to alter, decreasing or increasing the length of the lifting surface. The blades are moved from a fully extended position providing maximum lift, to a retracted position in which the blades are removed from the airstream. The pitch of the blades may be controlled by a pitch controller to achieve full helicopter responsiveness. A plurality of bladeletts may be positioned near the outer periphery of the rotor head. When they are moved into the airstream, passing air impacts the bladeletts exerting a pressure, causing rotational movement of the rotor blade assembly.

12 Claims, 20 Drawing Sheets

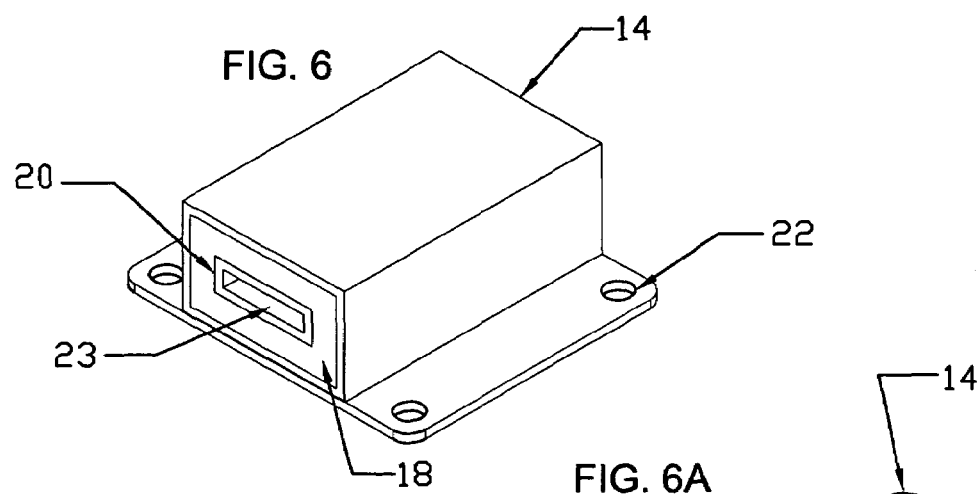
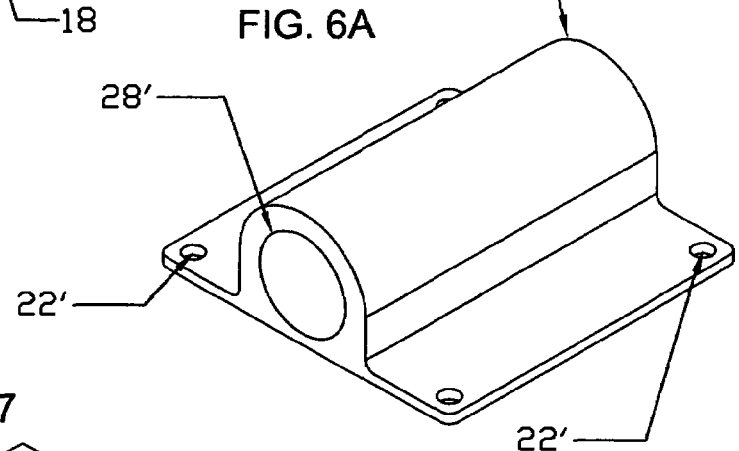
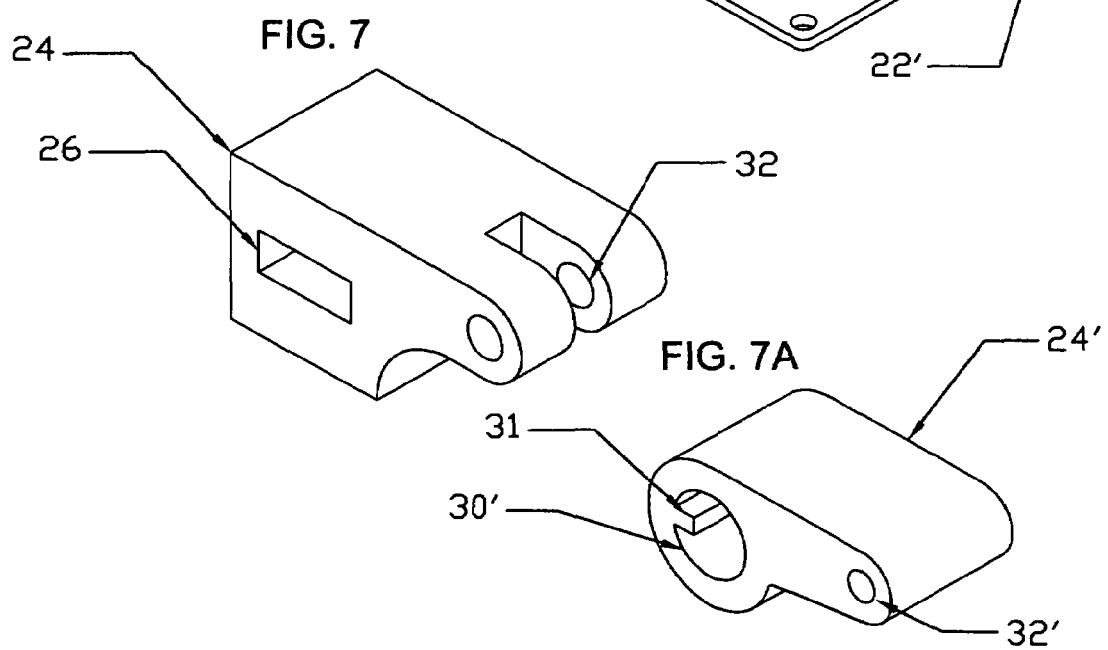
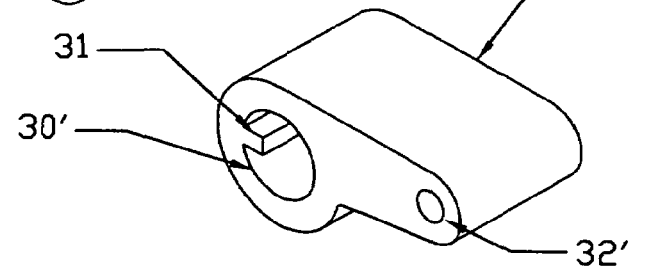

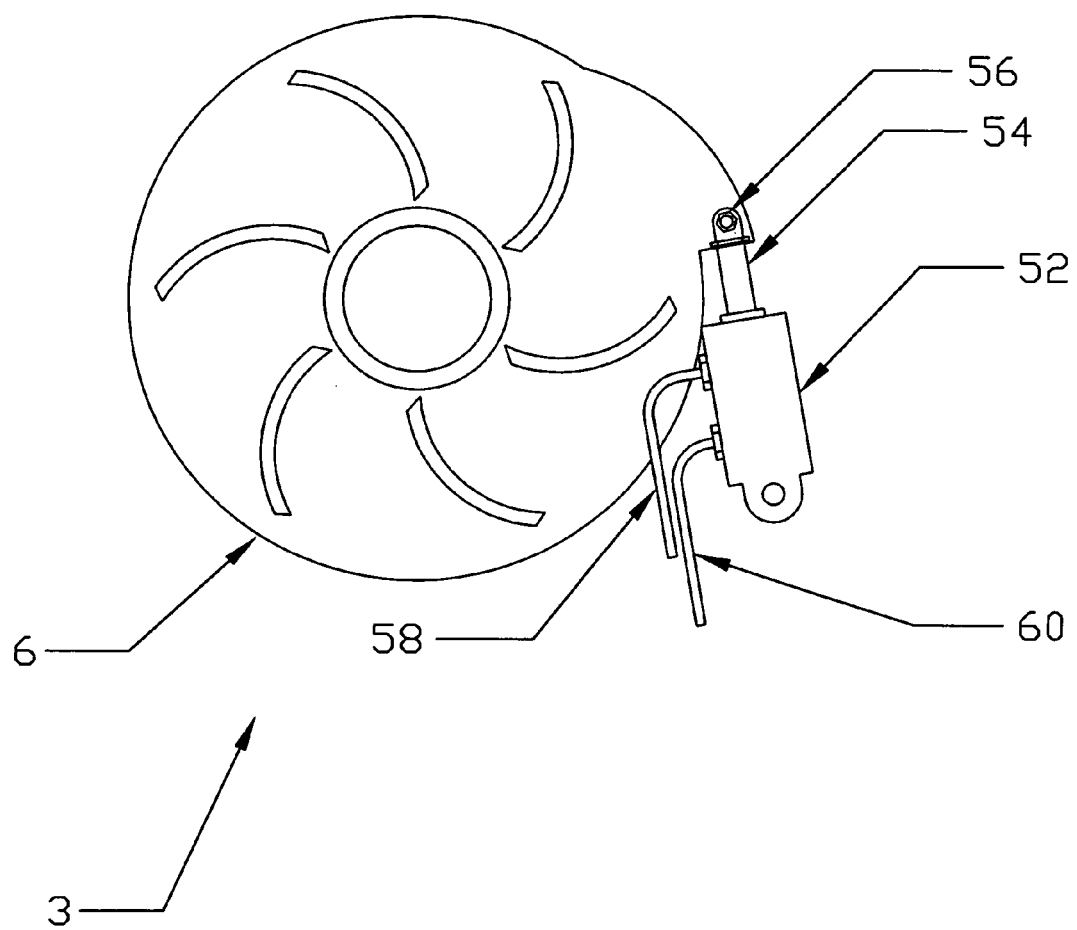

FIG. 11A
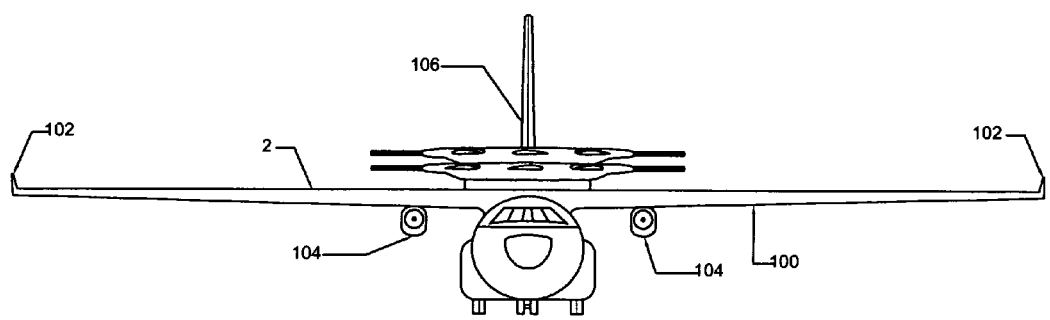
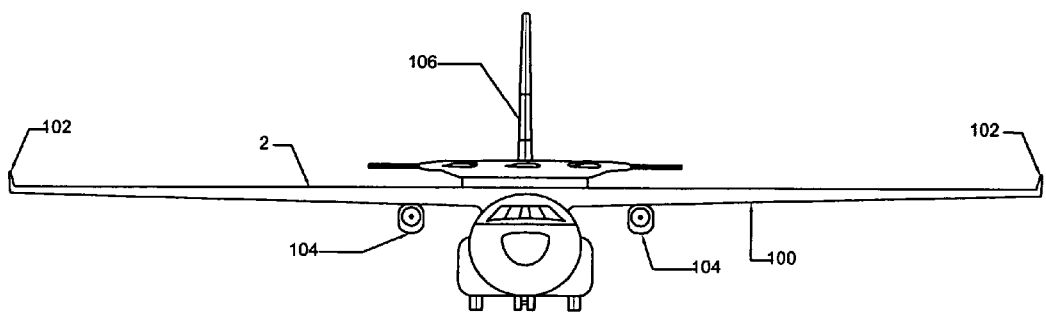

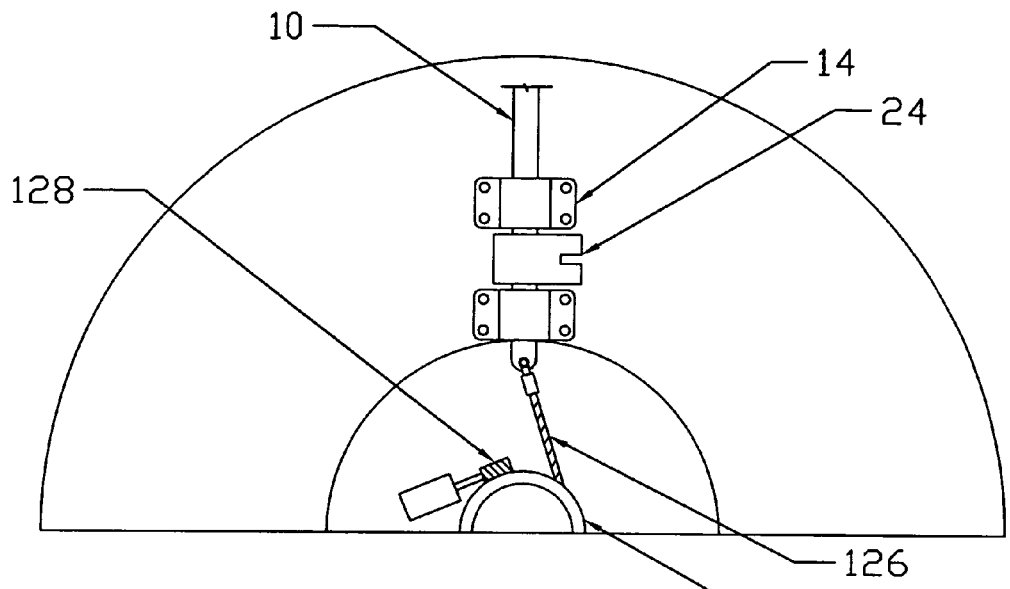
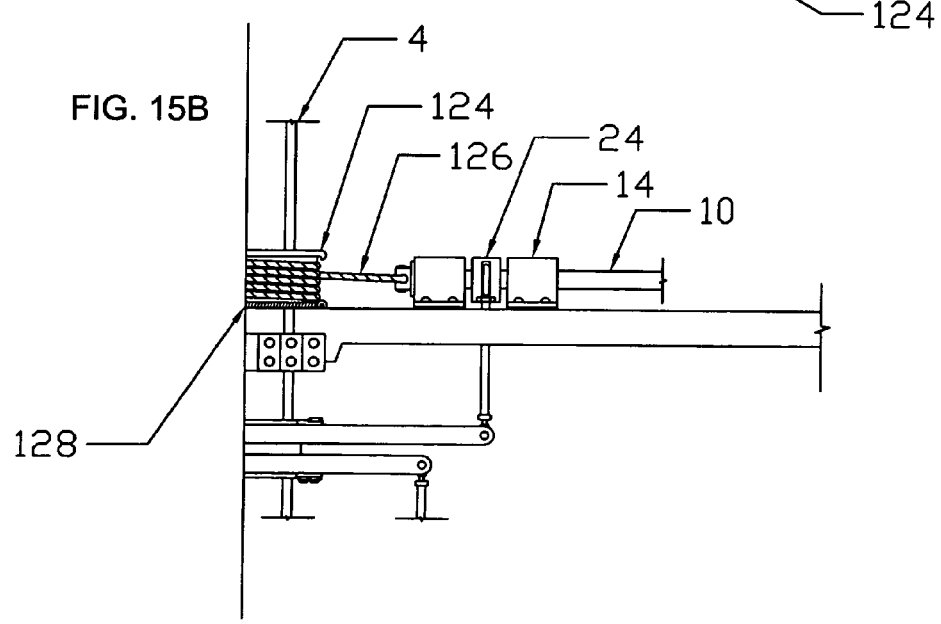

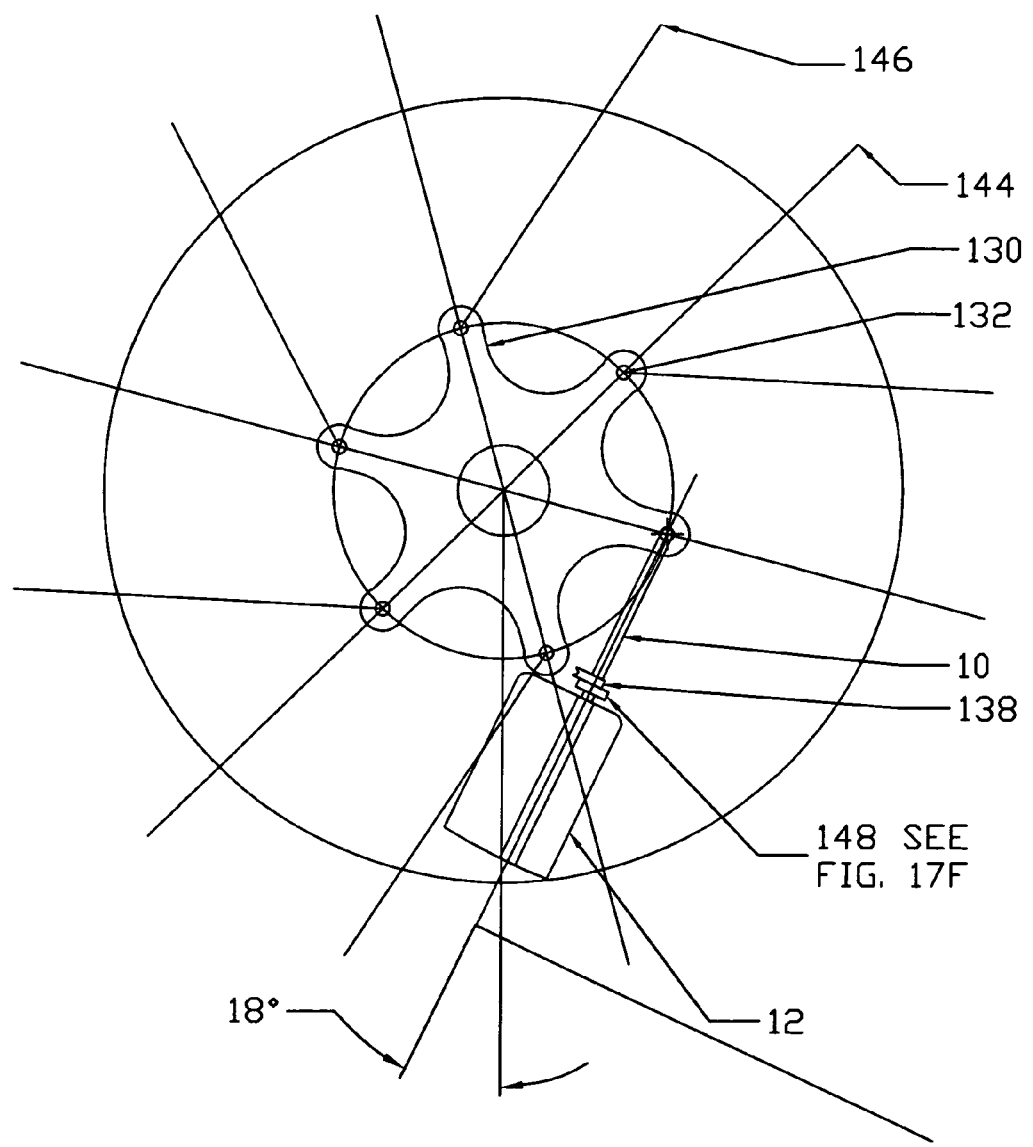

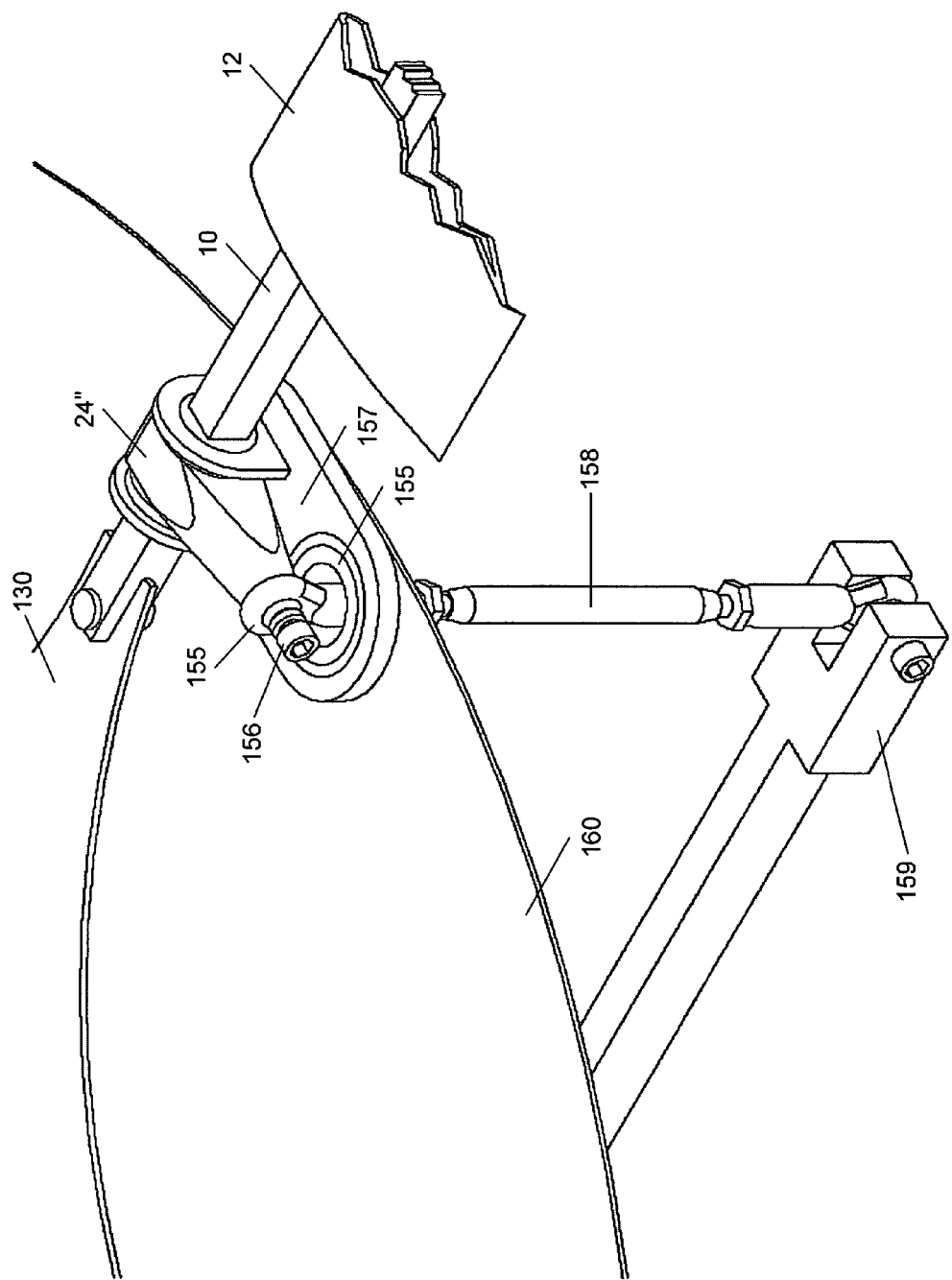

RETRACTABLE LIFTING BLADES FOR AIRCRAFT

CROSS-REFERENCE TO RELATED APPLICATIONS

This application is a continuation-in-part of and claims the benefit of U.S. patent application Ser. No. 10/657,838, filed Sep. 9, 2003 now U.S. Pat. No. 7,004,427, which is a claims benefit of the prior filing date of U.S. provisional patent application No. 60/409,582 filed on Sep. 9, 2002, both of which are hereby incorporated herein by reference.

FIELD OF THE DISCLOSURE

The disclosure is generally described as a rotorcraft type rotor-head having retractable blades, which may be fitted to either a fixed-wing or rotorcraft aircraft.

BACKGROUND OF THE DISCLOSURE

One of the main limitations of rotorcraft aircraft is the flight speed limitation caused by the physics and mechanics of flight. These limitations have plagued the helicopter since its conception. Retreating blade stall, dissymmetry of lift, leading, lagging, flapping and coning are just some of the forces that limit the top speed of helicopters. For example, most helicopters are limited to air speeds of less than 200 miles an hour. The present disclosure, the Gerbino Flight System, allows fixed wing aircraft to be lifted vertically and then translate into forward flight to speeds in excess of 300 miles an hour, because retreating blade stall and other problems are non-existent in that the rotating blades are taken out of the airstream in a new and nonobvious way. Once the aircraft is airborne and moving at sufficient forward speed to maintain lift, the rotating blades are gradually retracted with forward propulsion provided by one of any number of systems used by fixed wing aircraft to drive the aircraft forward. An aircraft utilizing the disclosure would have sufficient lifting surfaces to enable it to remain airborne after the rotor blades are fully retracted.

An autogyro incorporating retracting blades is shown in U.S. Pat. No. 6,062,508, however, it does not include the features described and claimed herein, which enable the present disclosure to achieve true helicopter flight. U.S. Pat. No. 4,913,376 depicts lifting blades protruding from a circular planform wing, but again, it does not include components enabling helicopter flight, nor retractable lifting blades.

SUMMARY OF THE DISCLOSURE

In one embodiment of the disclosure, a rotor blade assembly for providing vertical lift to an aircraft is disclosed, having a rotor head, a plurality of cam surfaces, a plurality of blades, with each blade attached to a cam surface, whereby movement of a cam surface causes the radial distance between the distal tip of the attached blade and the center of the rotor head to alter. In this way, the length of the lifting surface of each blade can be decreased or increased. In the preferred embodiment, the blades are moved from a fully extended position providing maximum lift, to a fully retracted stowed or parked position, in which the blades are completely removed from the airstream.

In another embodiment of the disclosure, an operating cam is rotatably mounted relative to the rotor head. A plurality of cam surfaces are placed on the operating cam and a blade is attached to each cam surface. As the cam surface moves, it causes the radial distance between the distal tip of the attached blade and the center of the rotor head to alter. In another embodiment of the disclosure, the blades have blade spars, with each blade spar attached to the cam surface.

In another embodiment of the disclosure, a rotor blade assembly for providing vertical lift to an aircraft comprises a rotor head, an operating cam, a plurality of cam surfaces on the operating cam, a plurality of blades, each blade having a root and a tip, each root attached to the cam surface, whereby movement of the cam surface causes the radial distance between the distal tip of the attached blade and the center of the rotor head to alter.

In yet another embodiment of the disclosure, at least one pitch controller is attached to at least one blade, and each such pitch controller is connected to a swash plate. The swash plate causes the pitch controller to move, causing the pitch of the corresponding blade to be altered.

In yet another embodiment of the disclosure, a plurality of bladeletts are positioned near the outer periphery of the rotor head. The bladeletts have a retracted position wherein substantially all portions of the bladeletts are within the outer periphery of the rotor head. A bladelett control mechanism for imparting force to the bladeletts is provided, wherein the force moves a portion of one or more bladeletts beyond the periphery of the rotor head, whereby passing air impacts the bladeletts exerting a pressure, which causes rotational movement of the rotor blade assembly. The bladelett control mechanism may include an actuator and an actuator cable connecting the actuator to the bladeletts whereby energizing the actuator, the cable is caused to transmit a force to one or more bladeletts moving said the bladeletts beyond the periphery of the rotor head and into the path of airflow.

In a further embodiment of the disclosure, the rotor blade assembly includes a blade spar on each blade, each blade spar is connected to one cam surface, a spar guide having an opening is attached to each blade spar to guide the blade spar in a sliding fit permitting the blade to extend and retract. The blade spar passes through an opening in a pitch controller, the opening in the pitch controller having an internal shape substantially matching the external shape of the blade spar. A pitch control rod interacts between the pitch controller and the swash plate, whereby the pitch controller controls the pitch of the blade spar with which it cooperates. The opening in the pitch controller may be rectangular or other shape such as polygonal or oval. The opening may also be splined having as few as one spline, or many splines. The cooperating blade spar would have a matching external shape.

In yet another embodiment of the present disclosure, a rotor blade assembly for providing vertical lift to an aircraft includes a rotatable wheel to which blades are attached such that movement of the rotatable wheel causes the radial distance between the distal tip of the attached blade and the center of the rotor head to alter. The rotatable wheel rotates relative to the rotor head. At least one pitch controller is attached to at least one blade. The pitch controller is connected to a swash plate, whereby the swash plate movement alters the pitch of the corresponding pitch controller.

In a further embodiment of the present disclosure, the spar guide is connected to the rotor head with a swiveling connector permitting the spar guide to swivel relative to the rotor head as the blade is retracted or extended.

In another embodiment of the present disclosure, the operating cam has upper and lower plates with cam surfaces on the upper plate substantially matching corresponding cam surfaces on the lower plate. Each blade spar is positioned between the upper and lower plates. Each blade spar is attached to a cam surface on the upper plate, and the substantially matching cam surface on the lower plate.

In another embodiment of the present disclosure, the operating cam has upper and lower plates with attachment points on the upper plate substantially matching corresponding attachment points on the lower plate. Each blade spar is positioned between the upper and lower plates. Each blade spar is attached to an attachment point on the upper plate, and the substantially matching attachment point on the lower plate.

In a further embodiment of the present disclosure, a rotor blade assembly for providing vertical lift to an aircraft includes a rotor head, one or more blades attached to the rotor head, a piston chamber at the proximal end (nearest to the center of the rotor head) of said one or more blades, a spar guide on each blade, and a piston on each spar guide cooperating with the piston chamber within the proximal end of the associated blade, whereby fluid is forced into one side of the piston chamber driving the associated blade hydraulically in one direction, and whereby when fluid is forced into the other side of the piston chamber the blade is driven in the other direction. At least one pitch controller is attached to at least one blade, and to the pitch controller is connected to a swash plate, wherein movement of the swash plate moves the pitch controller causing the pitch of the corresponding blade to be altered. Alternatively, the hydraulic system may be replaced with a screw system or an electromechanical actuator.

In yet another embodiment of the present disclosure, the distance between the distal end of the blade and the center of the rotor head is shortened by means of a cable attached to the blade. The cable length is controlled by a reel or drum.

BRIEF DESCRIPTION OF THE FIGURES

FIG. 6 Perspective view of a spar guide.

FIG. 6A Side view of an alternative embodiment of the spar guide of FIG. 6.

FIG. 7 Perspective view of a pitch horn.

FIG. 7A Side view of an alternative embodiment of the pitch horn of FIG. 7.

FIG. 8 Top view of a schematic of an operating cam actuator.

FIG. 11A Front view of the schematic of the aircraft of FIG. 11.

FIG. 15 Side view of an embodiment having an operating drum, partially cut away.

FIG. 16 Top view of a schematic of an alternative embodiment of an operating cam having fixed attachment points for the blade anchors, and depicting a blade in a withdrawn position.

FIG. 17F Top view of the pitch horn and spar guide assembly of FIG. 16.

FIG. 18 Perspective view of one embodiment of a pitch horn.

DETAILED DESCRIPTION OF THE DISCLOSURE

Figure 1:
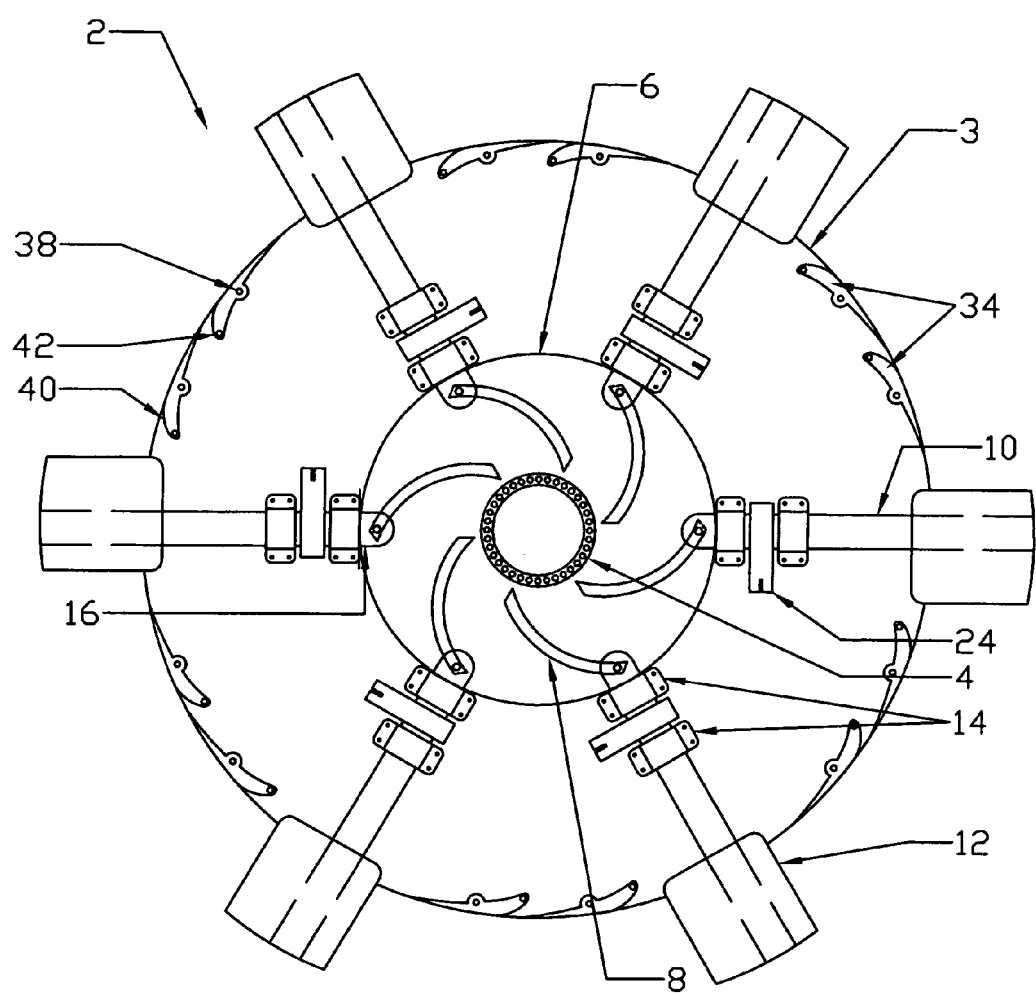
FIG. 1 Top view of a schematic depicting the major components of the rotor head assembly having cam grooves and extended blades.

A rotor head assembly 2 of the preferred embodiment is depicted in FIG. 1. The figure is not to scale. FIG. 1 depicts the condition of a helicopter in flight with the blades fully extended. This figure is a view from the top of the helicopter. The basic components are as follows. At the center of the drawing is depicted the hollow mast 4, which in the preferred embodiment is a standard helicopter mast. The drive shaft (not shown) is within the mast. Around the mast 4 are the rotor head bearings (not shown in this view) supporting the rotor head assembly 2. In turn, the operating cam 6 is bearing mounted (not shown in this view) on the rotor head 3 and can be rotated relative to the mast 4 and the rotor head assembly 2. Cam grooves 8 are shown, in which are mounted the proximal ends of the blade spars 10. The drawing shows one means of deploying the blades 12, utilizing cam grooves 8 having one particular configuration, but the grooves may be longer or shorter, have a deeper or shallower angle of attack, or may be otherwise configured to achieve the function of applying a force to the proximal ends of the blade spars 10 to control the distance that the blades 12 retract. As used in this patent, the term "cam" is used in its standard definition, for example as found in Webster's Unabridged Dictionary© 1996, 1998 MICRA, Inc.: (a) A turning or sliding piece which, by the shape of its periphery or face, or a groove in its surface, imparts variable or intermittent motion to, or receives such motion from, a rod, lever, or block brought into sliding or rolling contact with it. (b) A curved wedge, movable about an axis, used for forcing or clamping two pieces together. (c) A projecting part of a wheel or other moving piece so shaped as to give alternate or variable motion to another piece against which it acts. As the operating cam 6 is rotated, the blade spars 10 are drawn into the rotor head 3. In this figure, two spar guides 14 confine each blade spar 10, but the number of spar guides 14 can be greater than two, or may even be a single spar guide.

As is typical in helicopters generally, in the preferred embodiment of the disclosure the blade spars 10 run through the entire length of the blades 12. The spars are the core structures of the blades, and are made of a strong material such as stainless steel. The spars 10 run the length of the blade 12 and could have a honeycomb core covered with aluminum, fiberglass, carbon fiber, or any accepted material or combination of materials. The spars 10 are generally surrounded by a lightweight material such as fiberglass to form the lifting surfaces of the blades 12, and the leading edges may be reinforced with titanium, or another very tough material. However, it is contemplated that blade and blade spar structures may change in years to come as new materials are developed and new manufacturing processes are implemented. The precise structure of the blades or blade spars is not central to the disclosures claimed, which relate primarily to the retraction and extension of blades, rather than how they are constructed.

The cam system as depicted was chosen because it provides symmetrical retraction and extension of the blades 12 and assures control of the entire blade pitch range at any point through the complete cycle of the rotor head. In the drawings, simple pins are shown as the attachment means, or blade anchors 16, for the root of each blade 12 to the cam groove 8. However, the blade anchor 16 may take other forms, such as a lubricated fixture riding in the cam. The fixture may be a block (not shown) in the cam groove 8, shaped to ride smoothly in the cam groove 8. It may be made of any material compatible with the materials and the operating characteristics of the cam 6, which is contemplated in the preferred embodiment to be stainless steel or titanium. The block, and/or the cam groove 8 may have surfaces lined with a low friction material to reduce abrasion and wear. The choice of materials will depend on the operating characteristics of the aircraft, and there are many possible variations, and would be obvious to persons of ordinary skill in the art. This block may include a hole or other attachment mechanism to which a pin or other gripping member may be attached to the blade spar 10.

Another advantage of a cam system is that the blades 12 are all retracted and deployed simultaneously, preventing the inadvertent retraction or deployment in an imbalanced way.

In the preferred embodiment, each spar guide 14 has a central portion 18 made of a flexible material, such as an elastomeric (FIG. 6). The spar guides 14 are mounted to the rotor head 2 using any commonly used mounting mechanism such as a screw, bolt, rivet, etc. fastened through mounting holes 22. The flexible material within the spar guides allows rotational movement of the blade spars 10 allowing the pitch of the spars 10, and thereby the blades 12, to be controlled. The pitch is controlled by a pitch controller, which, in the preferred embodiment is a pitch horn 24 mounted between the two spar guides 14 and keyed to the spar through pitch horn channel 26. However, alternative constructions are possible where, for example, there may be more than two spar guides 14 and the pitch horn 24 may be located at a position spaced away from the spar guides 14. The pitch horn 24 controls the pitch of the blade spars 10 and thereby the blades 12 as is necessary to achieve helicopter-type flight, including vertical ascent and descent, as well as hovering. Another example of a pitch controller would be an ear (not shown) on the blade 12 or spar 10 connected to a pitch control rod. The pitch controller may be controlled by a pitch control rod, or an electric servo, a hydraulic mechanism, pneumatic servo or any combination thereof.

In the preferred embodiment the spar guides 14 are shown with a lining 20 made of Teflon or steel, for example, or some other material. The tolerances between the lining 20 of the spar guide 14 and the blade spars 10 are such that a slidable fit is achieved for guiding the spar 10 as it moves between the fully-extended and fully-retracted positions. The spar guide central channel 28 may be any cross-sectional shape that achieves these objectives. For example, it may be splined to mate with corresponding splines on the blade spars 10 to allow a slidable fit while at the same time firmly securing the blade spars 10 during pitch adjustment. The pitch channel horn 30 in the pitch horn 24 will correspond to the shape and configuration of the blade spars 10.

A connection point 32 on each pitch horn 24 is connected to rotor blade pitch controller links such as pitch control rods, which control the pitch of the helicopter blades. In the preferred embodiment, pitch movement may be between +/−0° to 15°, or as otherwise required for the flight characteristics of the aircraft. During the process of either retracting the blades 12 or deploying the blades, the pitch horns 24, in combination with the spar guides 14 and blade spars 10, continue to provide pitch control for the blades 12 through the pitch links such as pitch control rods 82, which are connected to the swash plate.

Note that the number of spars 10 and blades 12 are not critical to the disclosure. Any number may be used to achieve the desired lift and flight characteristics, within the parameters of the structure of the rotor head 2 and operating cam 6. For example, as few as two blades may be used, up to many more, such as four, five or a higher number, even twenty or more in a large diameter assembly used for lifting heavy vehicles.

Figure 2:
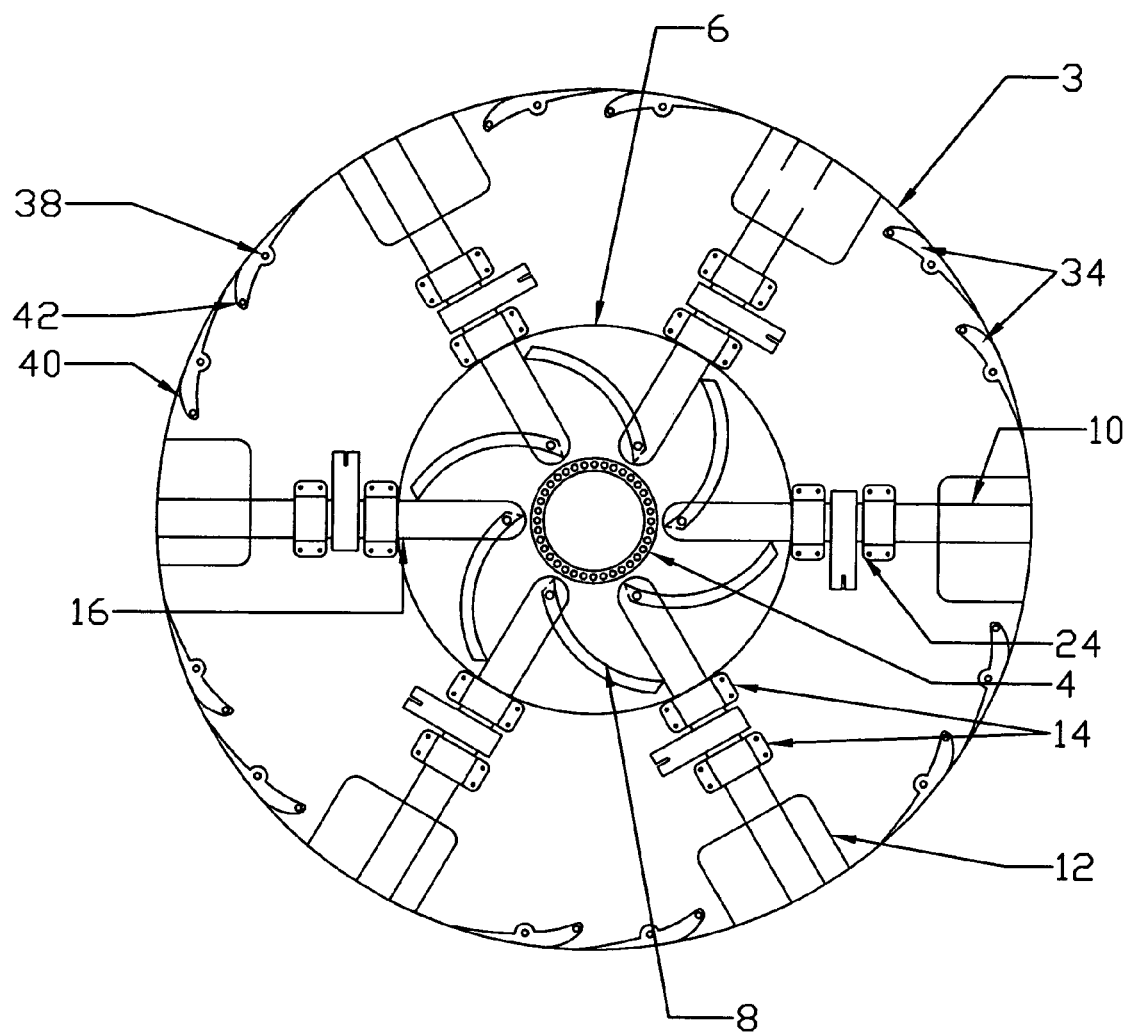
FIG. 2 The view of FIG. 1 with blades retracted.
Figure 3A:
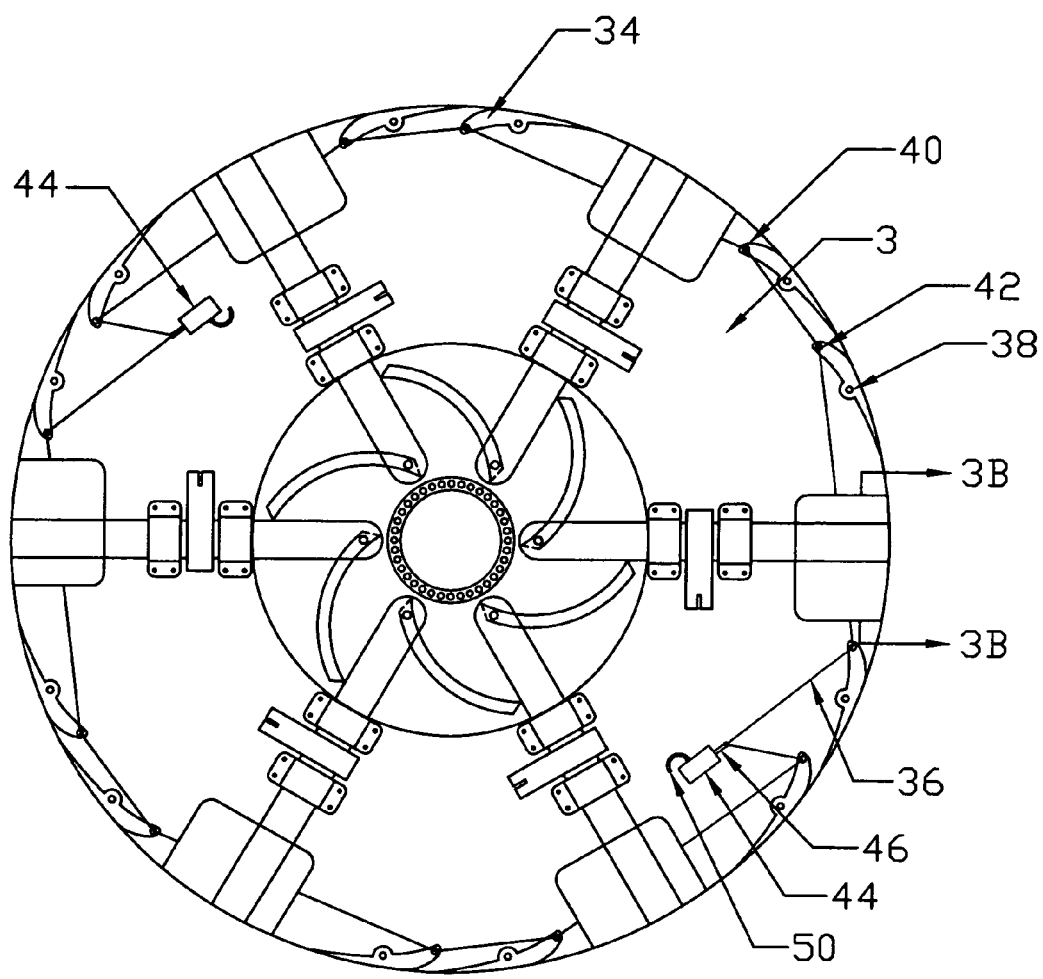
FIG. 3A The view of FIG. 1 with bladelett control mechanism included.

The bladeletts 34, an accessory and not a necessity to all applications of the flight system disclosed but which may be added to all embodiments, in standard flight are normally retracted as shown in FIGS. 1, 2 and 3A. The bladeletts 34 provide a safety mechanism as follows. In normal flight, as the rotor head assembly 2 rotates, it causes the blades 12 to rotate, which thereby provides lift and control for the aircraft. In normal flight, the bladeletts 34 are retracted to provide a clean airflow surface. In the present disclosure, during normal forward flight, after the aircraft has achieved sufficient forward speed to allow it to remain airborne, without needing the lift created by the blades 12, the blades 12 are withdrawn, and there is no need to continue rotation of the rotor head assembly 2. If desired, the rotor head assembly 2 may be stopped to conserve energy and fuel. However, rotation of the rotor head assembly 2 must be restarted as the aircraft slows, or when a decision is made to operate in a typical helicopter mode. This can be achieved returning power to the rotation system. However, in the event of an engine failure in forward flight, the aircraft can convert to the helicopter mode as follows. The bladeletts 34 will be deployed into the slipstream and the operating cam 6 deactivated and allowed to rotate freely. The bladeletts 34 are shaped to catch air such that the assembly rotates in the proper direction. The blades 12 will then deploy by centrifugal force allowing the aircraft to make a safe autorotation landing. The number of bladeletts 34, their shapes and the angles of deployment may be modified from what is shown in the drawings.

A bladelett deployment mechanism is depicted in FIG. 3A. Tension on the actuation cable 36 rotates the bladeletts 34 around their central mounting holes 38. As rotation speed increases and nominal operating rpm is reached, the blades 12 are deployed electrically, mechanically, hydraulically, pneumatically, or by employing the centrifugal force generated by the rotation to pull the blades 12 from the retracted position shown in FIG. 3A to a fully deployed position as shown in FIG. 1. Thereafter, the bladeletts 34 can be retracted to provide a relatively clean airflow surface. The number of bladeletts 34 is not critical to the preferred embodiment. In the preferred embodiment, each of the bladeletts 34 has a center mounting hole 38 allowing the attachment of the bladelett 34 to the rotor head 3 with sufficient clearances to allow rotational movement of the bladelett 34 relative to the attaching mechanism. The attaching mechanism may be a bolt, pin, screw, rivet or any other mechanism through the center mounting hole 38 that will provide a secure connection while allowing rotational movement of the bladeletts 34. The control end 40 of the bladelett includes an attachment point 42 for a control mechanism or bladelett actuator 44 to rotate the bladelett in and out of the air stream.

The bladelett actuator 44 is a servo, which operates electrically, mechanically, hydraulically, magnetically or otherwise. It is attached to the rotor head 3 and comprises an arm 46, a body 48 that houses the servomechanism and a power source 50, which could be electrical or hydraulic power. When activated, the arm 46 is retracted into the actuator 44, increasing tension on the actuation cable 36, which causes the bladeletts 34 to rotate around their center mounting holes 38. FIG. 3A depicts two actuators 44, which provide redundancy. The bladeletts 34 are biased into their retracted positions using any suitable biasing mechanism, such as springs.

The operating cam 6 may be rotated in several different ways. A screw jack system may be employed, a hydraulic actuator could be another choice, a servo motor, a rack and pinion assembly, a worm gear assembly, crossed helical gears, pneumatic or hydraulic or any other means to impart force to the operating cam to cause rotation. FIG. 8 depicts one version of a rotation mechanism, which includes a hydraulic cylinder 52 attached to rotor head 3. It is connected to the operating cam 6 by a rotation mechanism arm 54 attached to the operating cam 6 by a pin or rotation mechanism bolt 56. Sufficient clearance is provided to allow the rotation mechanism bolt 56 to rotate relative to operating cam 6. Hydraulic fluid is introduced into the hydraulic cylinder 52 through first and second feed lines 58 and 60 respectively, pressurizing the cylinder to move the rotation mechanism arm 54 either inward or outward relative to hydraulic cylinder 52, thereby rotating the operating cam 6 either clockwise or counterclockwise, thereby causing the cam grooves 8 to move the blade spars 10 and blades 12 either inwardly or outwardly of the operating cam 6. The attachment point for the rotation mechanism bolts 6 to the operating cam 6 may be placed anywhere on the operating cam 6, whether on the outside edge of the operating cam 6 or somewhere between the outside diameter and inside diameter of the operating cam 6. In the preferred embodiment, the hydraulic cylinder 52 is attached to the rotor head 3.

Figure 3B:
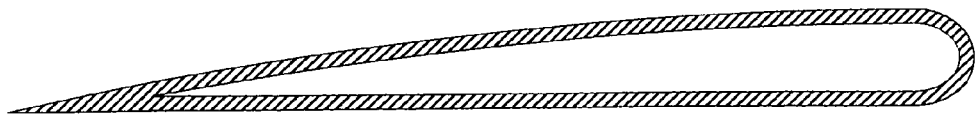
FIG. 3B Cross-sectional view of one possible blade shape.
Figure 4:
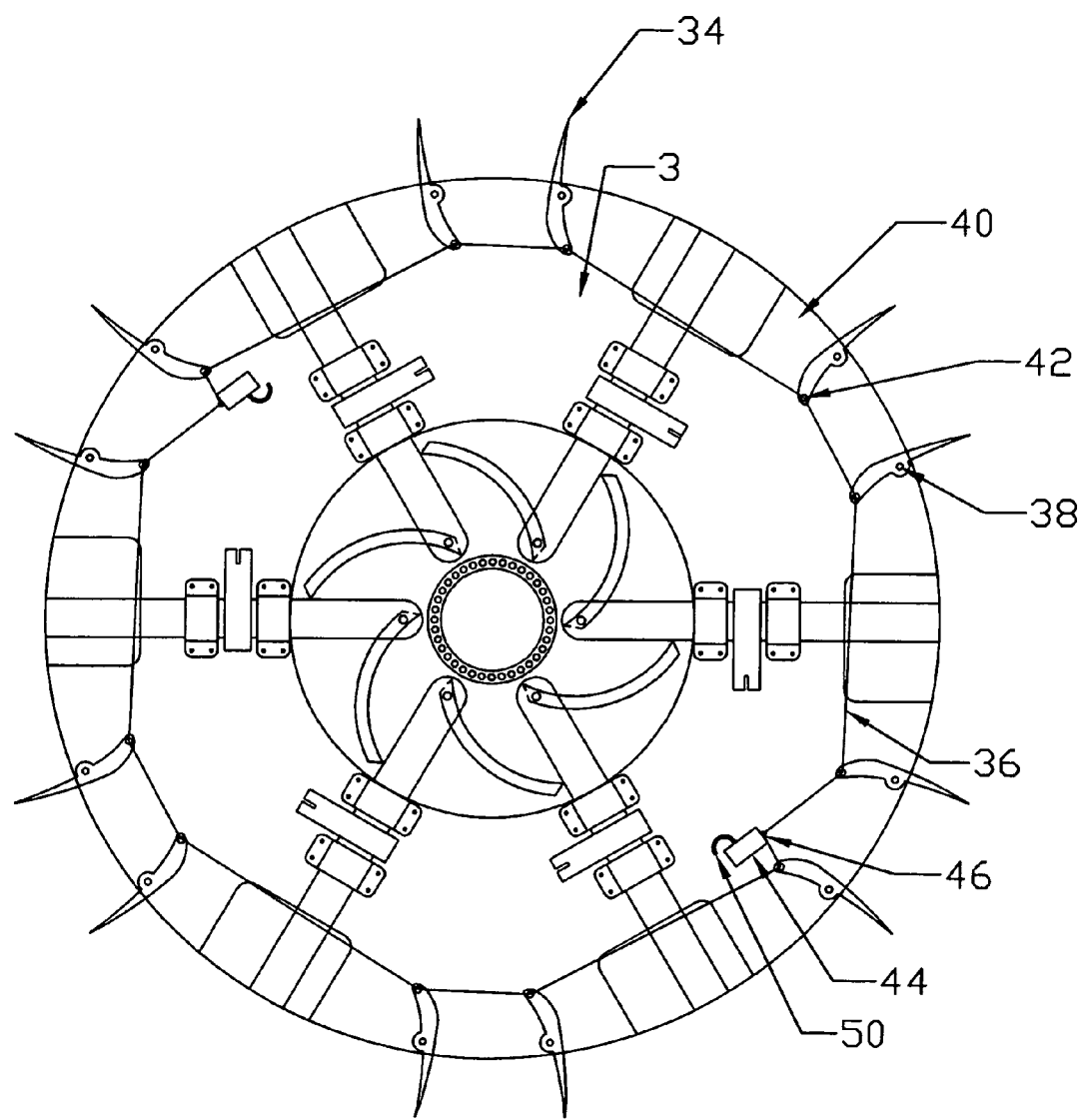
FIG. 4 The view of FIG. 3A with bladeletts deployed.

As depicted in FIG. 3B in the preferred embodiment, the helicopter blades 12 are cambered in the manner of a wing as opposed to having the standard elliptical shape of a helicopter blade. This provides improved lift to drag (L/D) ratio. However, the cross-sectional shape of each blade may be any shape necessary to achieve the desired flight characteristics, and may even change cross-section at various distances along the blade from the root to the tip. Depending on the lift and flight characteristics desired, the number of blades could be any number necessary, and blade length and cross-sectional shape may be modified as is known in the art.

Figure 17A:
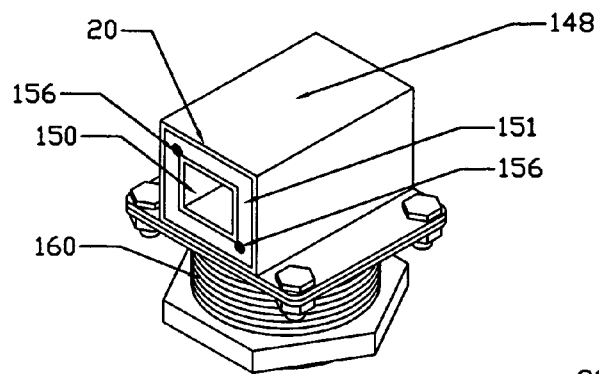
FIG. 17A Perspective view of one embodiment of the spar guide in FIG. 16, with swivel assembly.
Figure 17B:
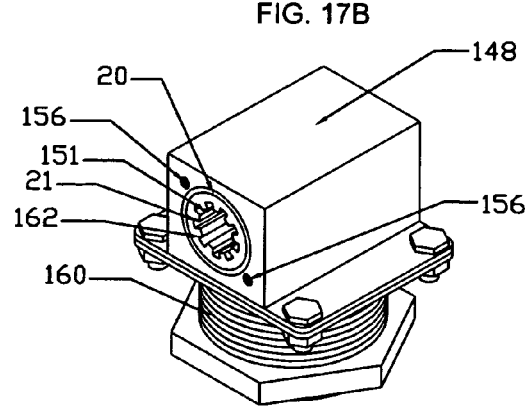
FIG. 17B Perspective view of an alternative embodiment of the spar guide in FIG. 16, with swivel assembly.
Figure 17C:
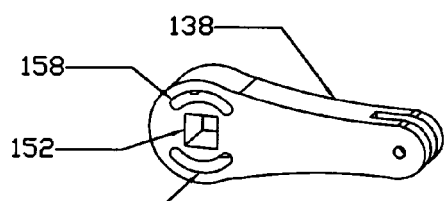
FIG. 17C Perspective view of one embodiment of the pitch horn in FIG. 16.

In the preferred embodiment, the spar guides 14 are depicted as simple stationary devices that have an internal flexibility, which allows for rotational movement of the blade spars 10. However, the spar guide 14 may be as depicted in FIGS. 6A, 17A and 17B, or other configurations that would be obvious to someone ordinarily skilled in the art, and the pitch horn 24 may be as depicted in FIGS. 7A, 17C, 17D, 18, 19 and 20 or other configurations that would be obvious to someone ordinarily skilled in the art. Specifically, in FIG. 6A, alternative spar guide 14' has a circular alternative spar guide central channel 28' in which a compatibly shaped spar guide can move. Similarly to spar guide 14, alternative spar guide 14' is mounted to the rotor head 2 by fasteners through alternative spar guide mounting holes 22'. FIG. 7A depicts a compatible alternative pitch horn 24', which includes an alternative pitch horn channel 30' having a key or spline 31 for cooperating with a keyway on the spar. As the alternative pitch horn 24' is rotated by a control rod attached at alternative pitch horn connection point 32', the key 31 rotates the spar by exerting force on the surfaces of the keyway.

Figure 19:
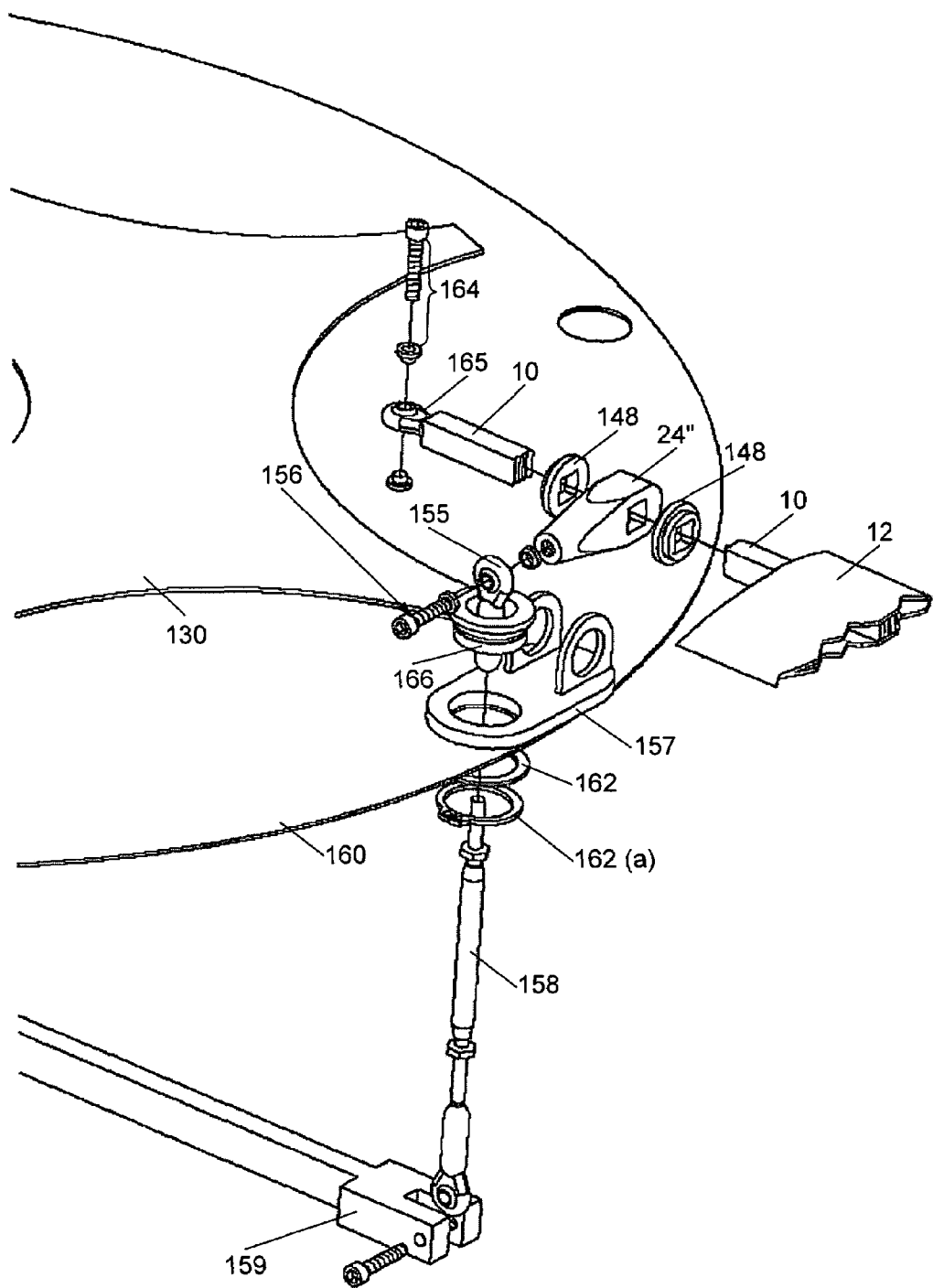
FIG. 19 Exploded view of one embodiment of the pitch horn of FIG. 18.
Figure 20:
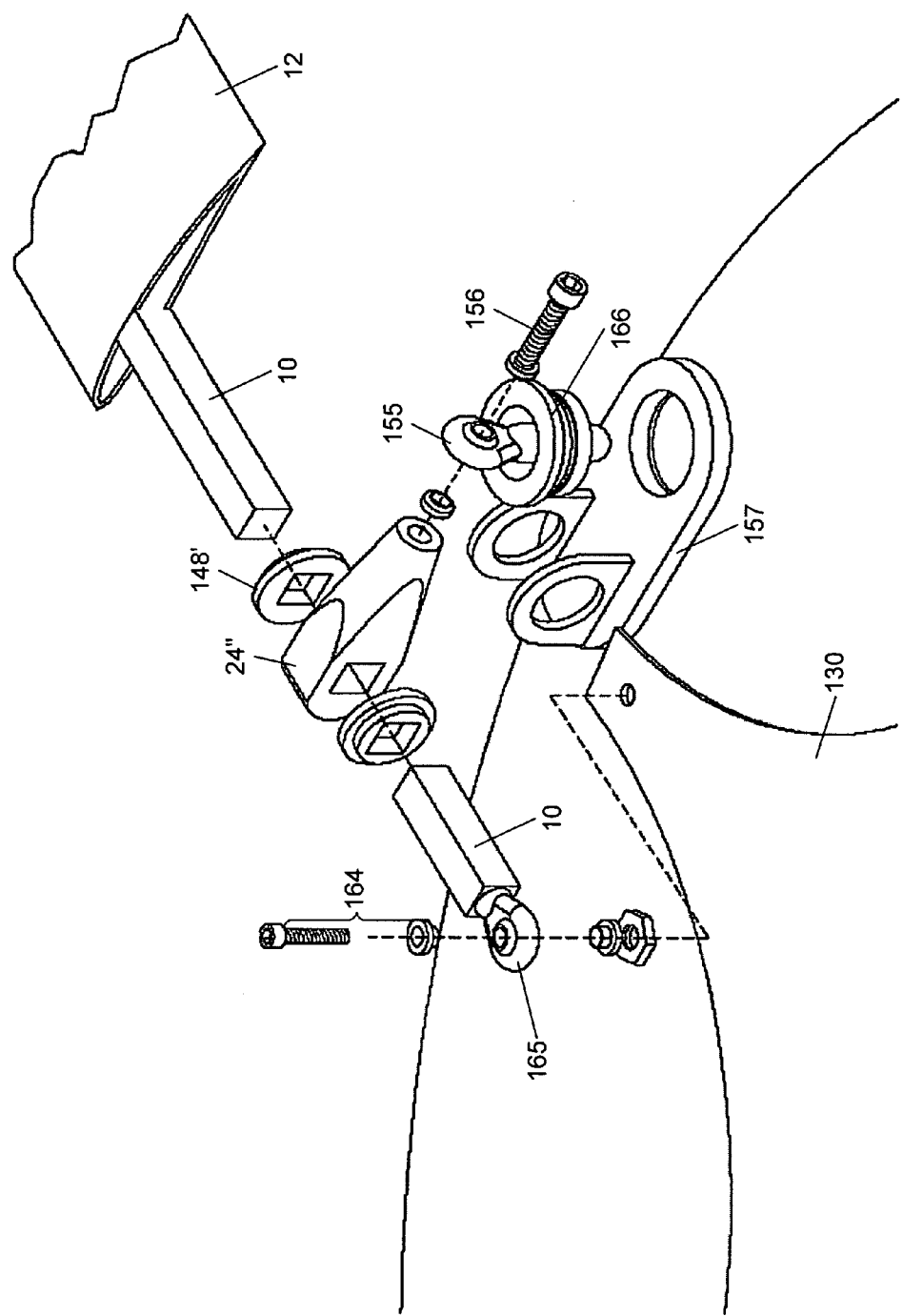
FIG. 20 Exploded view of one embodiment of the pitch horn of FIG. 18.

FIGS. 18, 19 and 20 depict an alternate embodiment of a pitch horn. As depicted in FIG. 18, the assembly comprises a swash plate arm 159 attached to a pitch link 158 which is in turn attached to a spherical bearing 155. As the pitch link 158 moves, it causes the pitch horn 24" to move. The pitch horn 24" movement causes the blade spar 10 and blade 12 to rotate about their longitudinal axes as the pitch is changed by the pitch horn 24". As can be seen in FIG. 19, the pitch horn 24" and its bushings 148' or spar guides have an opening to receive the blade spare 10. Further, referring to FIG. 19, the pitch horn channel 30 in the pitch horn 24 will correspond to the shape and configuration of the blade spars 10.

Further, the pitch horn 24" and the bushings 148' are retained in the pitch arm base 157. As shown in FIG. 19, the pitch arm base 157 is secured to the base plate 160 by the pitch arm base bushing 166 and the snap rings 162, 162(*a*). In one embodiment, this allows the pitch arm base 157 to swivel. As can be seen, the aperture in the pitch arm base 157 is sized so to provide clearance for the pitch link arm 158. In one embodiment, the pitch link arm 158 has spherical bearings at the top and bottom and has an adjustable length.

Further, as depicted in FIG. 20, the pitch arm base 157 is attached to a lobed operating cam 130 via a spherical bearing 165 and screw 164, which allows the blade spar 10 to rotate around its longitudinal axis. The lobed operating cam 130 rotates and causes the blade spars 10 to slide in the pitch controller 24" and the blades 12 in turn are extended outside the outer diameter of the rotor head, or are withdrawn into the rotor head (not depicted). The combined pitch controller 24" and blade spar 10 are mounted on the rotor head 3 in a manner allowing rotation of each combined pitch and spar guide controller 62 as the lobed operating cam 130 is rotated, and also allowing each combined pitch and spar guide controller 62 to pitch in reaction to an attached pitch control rod (not shown). The system can be designed to rotate either clockwise or counterclockwise.

Figure 5:
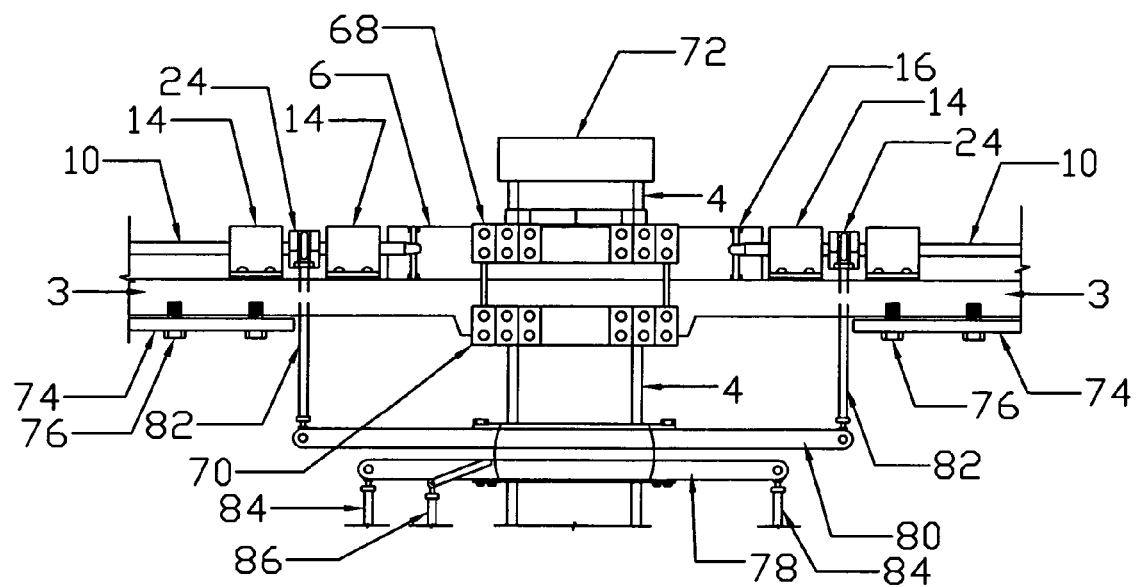
FIG. 5 Side view of a schematic of a rotor head assembly, partially cut away.

An elevation view of a rotor head assembly 2 of the preferred embodiment is depicted in FIG. 5. The figure is not to scale. The structure of the present disclosure surrounds the mast 4. The rotor head assembly 2 moves relative to the mast on a cam-bearing assembly, which in the preferred embodiment is a ball-bearing type. However, any other type of bearing structure may be employed provided that it meets the load requirements of the particular design. In the space along the mast 4 above the upper cam bearing 68 and the retaining nut 72 may be located the upper rotor cover (not shown). The rotor covers provide an aerodynamic envelope for the rotor blades and the enclosed mechanisms. The rotor covers may also provide lifting body characteristics to the aircraft, but are not essential to the disclosure itself.

The cam-bearing assembly has two major components, the upper cam-bearing assembly 68 and the lower cam-bearing assembly 70. In this drawing, the lower rotor cover 74 is shown at its attachment points affixed by fasteners such as screws 76 shown in FIG. 5.

The swash plate assembly may be any standard construction known in the art. Commonly the swash plate assembly consists of two plates: the fixed swash plate 78 and the rotating swash plates 80. The rotating swash plate 80 rotates with the drive shaft and the rotor's blades. In the preferred embodiment, the drive shaft, which is inside the mast 4, rotates the rotor head 3, and consequently the blades 12 and the pitch control rods 82, which, by virtue of the fact that they are connected to the rotating swash plate 80, impart rotation to the rotating swash plate 80. The pitch control rods 82 allow the rotating swash plate 80 to change the pitch of the rotor blades 12. The angle of the fixed swash plate 78 is changed by the cyclic control rod 84 and collective control rods 86 attached to the fixed swash plate 78. Not all control rods are depicting in the figures for the sake of clarity. The rods may also be tubes, or equivalent structure. The fixed plate's control rods are affected by the pilot's input to the cyclic and collective controls, which in turn raise or lower the cyclic control rods 84 and collective control rods 86. The fixed 78 and rotating 80 swash plates are connected with a set of bearings (not shown) between the two plates. These bearings allow the rotating swash plate 80 to spin on top of the fixed swash plate 78. The mast 4 does not necessarily need to extend all the way to the top of the rotor head assembly 2. The rotor head 3 could be supported by the drive shaft itself. Also, the operating cam 6 itself could rest on the drive shaft, and eliminate the need for bearings between the operating cam 6 and the stationary mast 4. However, in the preferred embodiment, the nonrotating mast 4 provides a strong structure to support the operating cam system.

Figure 9:
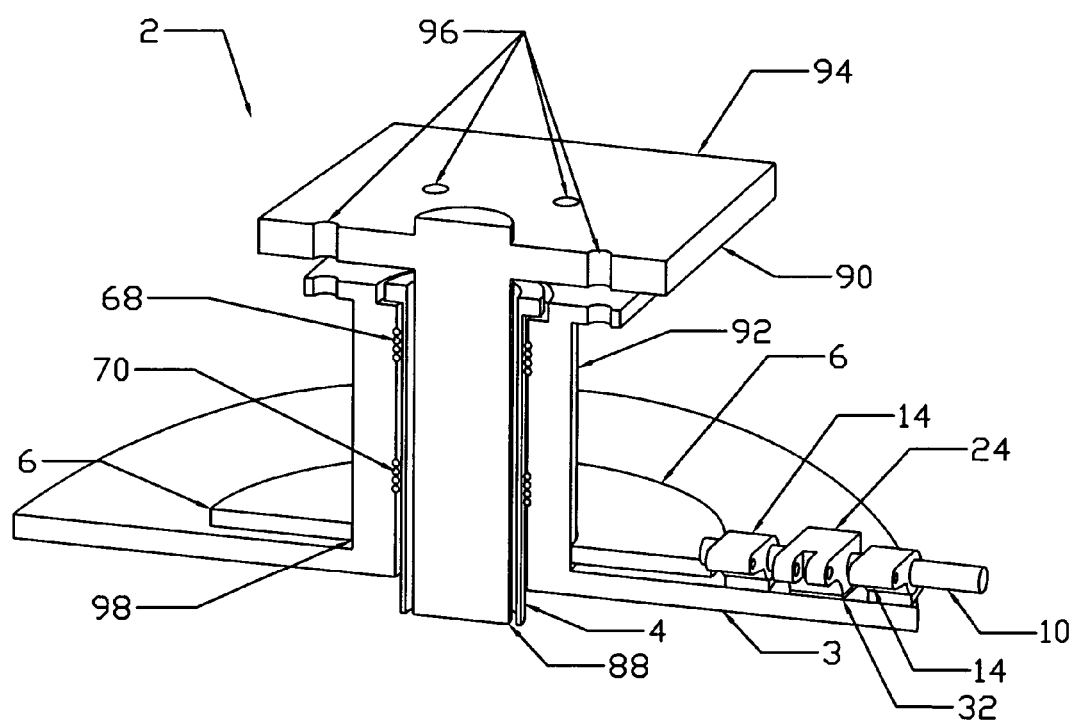
FIG. 9 Side view of a schematic of a drive shaft in a mast.

FIG. 9 depicts one embodiment of a drive shaft 88 inserted through mast 4 and fixed to a rotor head drive flange 90 on a rotor head extension 92, which is either integral with, or fixedly attached to, the rotor head 3. The drive shaft 88 has a drive shaft mounting surface 94 which is attached to the rotor head drive flange 90 by means of fasteners such as bolts, screws, rivets or equivalent fasteners placed in attachment holes 96. Thereby, as the drive shaft 88 rotates, the rotor head 3, and the entire rotor head assembly 2 rotates. The operating cam 6 is allowed to rotate relative to the rotor head extension 92 at a rotatable surface 98, such as a bearing.

In another alternative embodiment, the mast 4 may rotate and serve as the drive shaft. This is a typical construction seen in many helicopters in existence today. Obviously, in such an embodiment, there would be no need for bearings between the operation cam and the mast, and the rotor head and the mast. Either type of design could accommodate the disclosure described and claimed herein.

Figure 10:
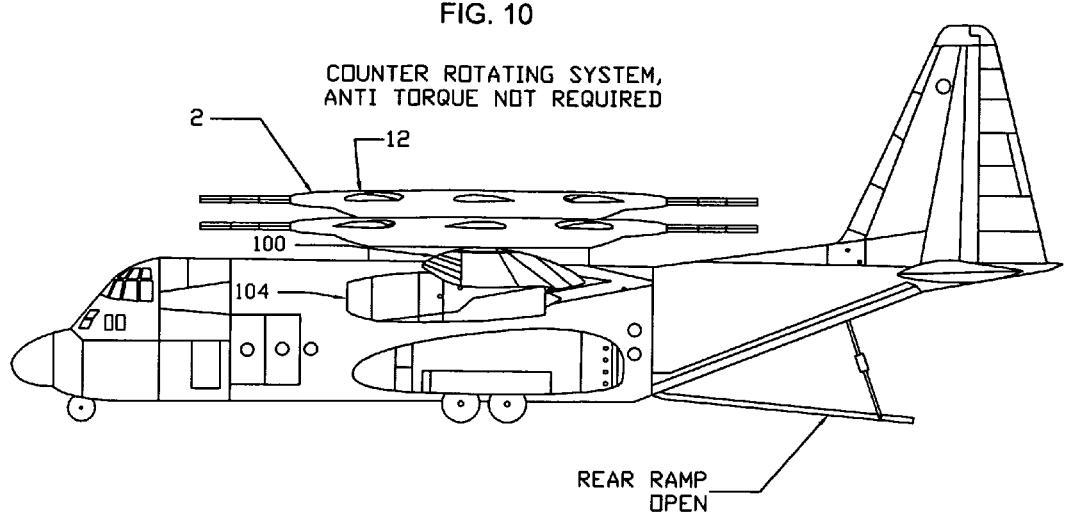
FIG. 10 Side view of a schematic of an aircraft depicting an installation of one embodiment of the present disclosure.
Figure 11:
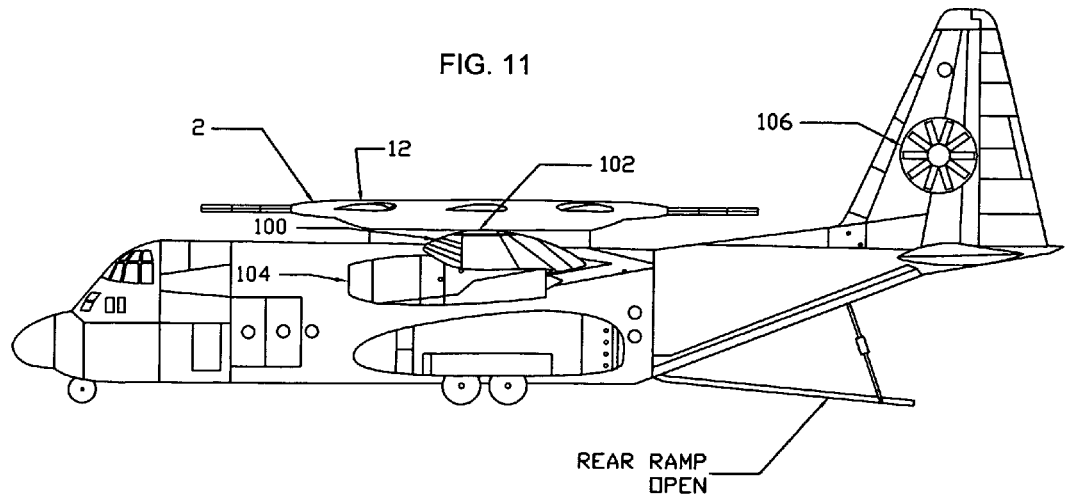
FIG. 11 Side view of a schematic of an aircraft depicting an alternative installation of one embodiment of the present disclosure.

FIGS. 10, 11 and 11A depict an installation of the rotor head of the present disclosure to a hybrid aircraft configuration. The rotor head assembly 2 is shown in its covered condition with both the upper and lower rotor covers attached. It should be noted that the cover may be constructed of several components, or several pieces to achieve the desired aerodynamic effect and to cover the structure within as desired. The aircraft depicted has conventional wings 100 including winglets 102, fan jets 104 and a Fenestron 106. The figures are not to scale, but merely illustrative. The physical appearance of the aircraft to which the device of the present disclosure is attached may be altered significantly from the appearance depicted in the drawings, to meet operational requirements. A vectored jet may be used instead of the Fenestron 106.

Figure 12:
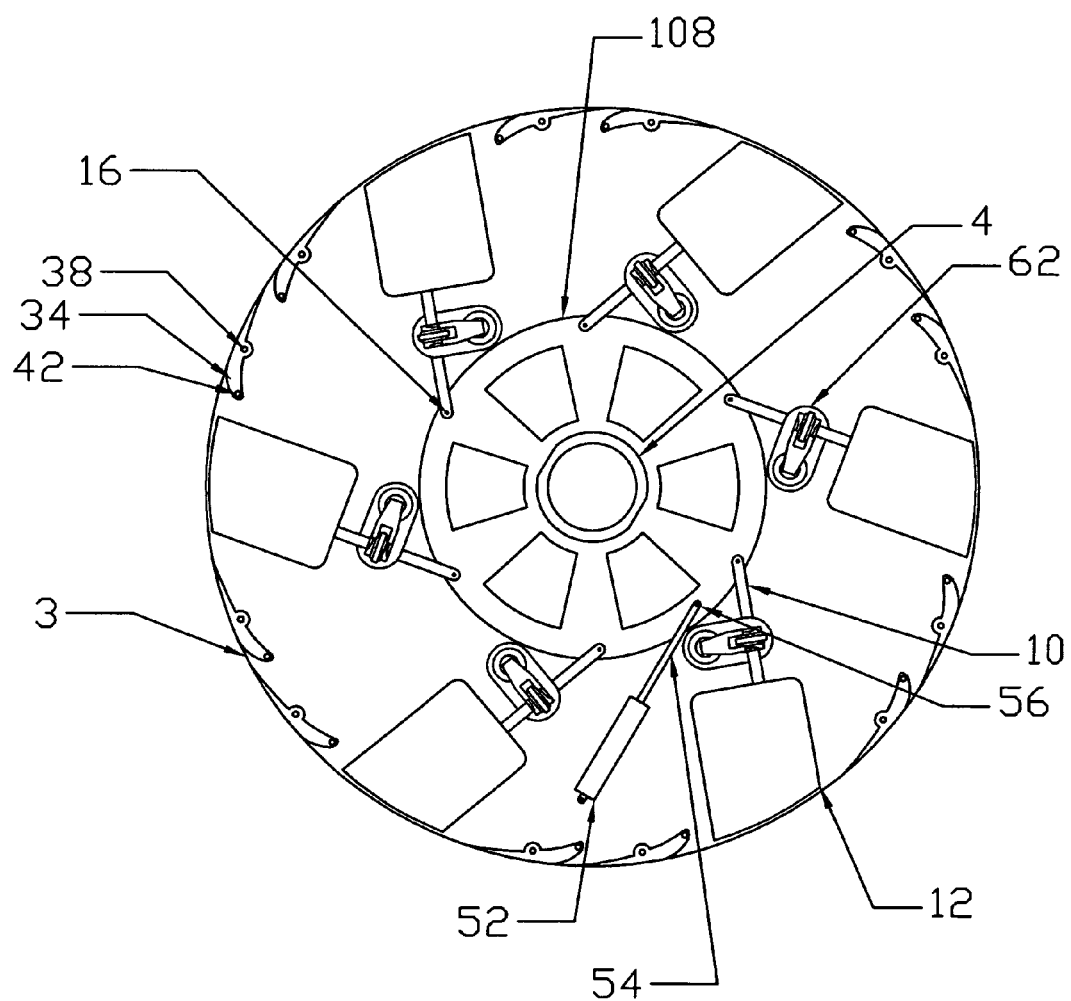
FIG. 12 Top view of a schematic depicting the major components of the rotor head assembly having an operating wheel with blades retracted.

FIG. 12 depicts an embodiment, which has an operating wheel 108 instead of an operating cam 6. Similar to the operating cam embodiment, the operating wheel 108 rotates relative to the mast 4. The rotation of the operating wheel 108 moves the blade anchors 16 toward or away from the outer diameter of the rotor head 3. During this rotation, the blade spars 10 slide in the combined pitch and spar guide controllers 62, and the blades 12 in turn are extended outside the outer diameter of the rotor head, or are withdrawn into the rotor head 3. The system can be designed to rotate either clockwise or counterclockwise. The operating wheel actuator may be a hydraulic cylinder 52 with a hydraulically-operated piston, an electromagnet, a system of gears including worm gears, helical gears, spur gears a rack and pinion system, or other means for rotating the operating wheel 108, depending on design choices. The combined pitch and spar guide controllers 62 are mounted on the rotor head 3 in a manner allowing rotation of each combined pitch and spar guide controller 62 as the operating wheel 108 is rotated, and also allowing each combined pitch and spar guide controller 62 to pitch in reaction to an attached pitch control rod (not shown). The drawing is a schematic, not to scale, and shows six blades, but there may be any number of blades, depending on design choices. The swash plate assembly operates essentially the same as discussed previously. The blades can be swept forward or aft (clockwise or counterclockwise) to the rotation of the system, to be determined by flight tests for each application and type of aircraft.

Figure 13:
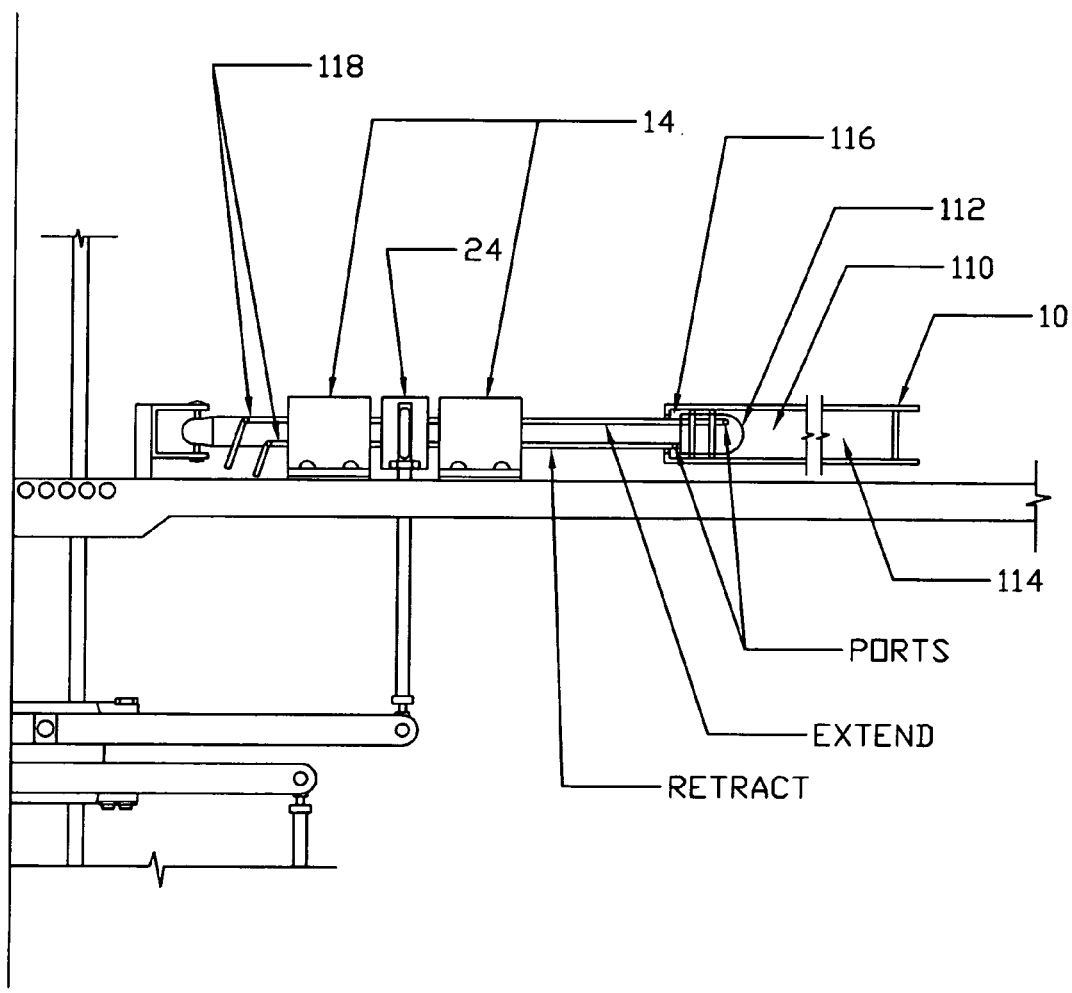
FIG. 13 Side view of a telescoping spar assembly, partially cut away.

FIG. 13 depicts an embodiment wherein the spar 10 is retracted and/or extended hydraulically or pneumatically. The proximal end of the spar 10 includes a sealed fluid chamber 110 in which a stationary piston 112 is placed. Fluid is injected into, and drained from, a chamber fore 114 and a chamber aft 116 of the stationary piston 112 through ports connected to piston hydraulic lines 118, whereby the pressure changes fore and aft of the piston 112 cause the spar to retract or extend. The drawing is a schematic, not to scale, and shows only one blade, but there may be a plurality of blades. The swash plate assembly, including the control rods, operates essentially the same as discussed previously. Spar guides 14 and a pitch control horn 24 operate in essentially the same way as discussed previously. The spars may also be telescoping, having for example, two or three stages. In this configuration, there is no need for an operating cam or operating wheel. In an alternate construction, instead of hydraulic or pneumatic force, a screw assembly could be used, or a magnetic or electric actuator.

Figure 14A:
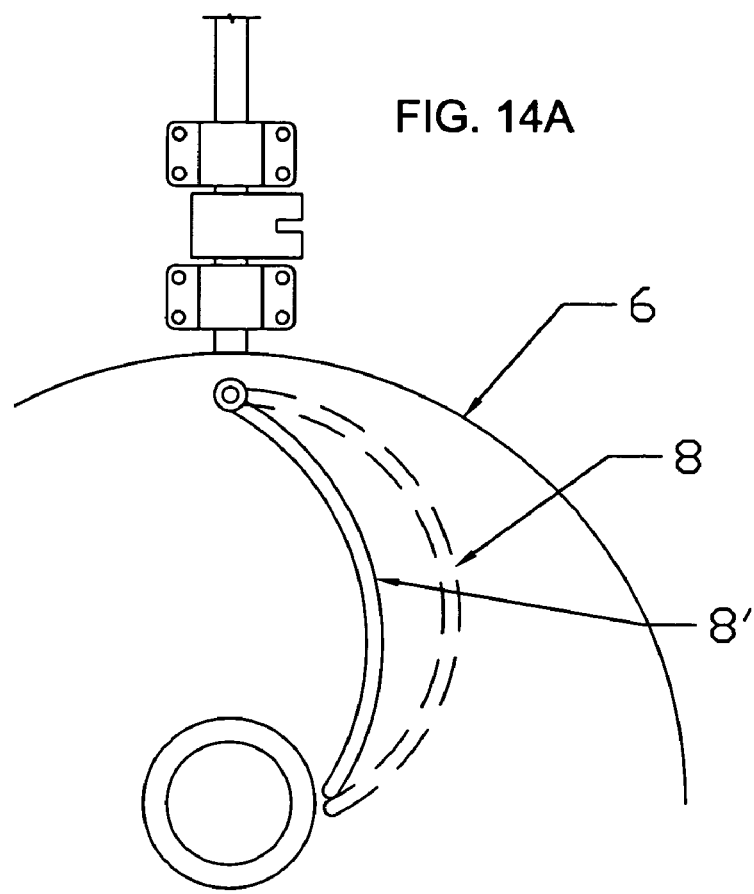
FIG. 14 Side view of an embodiment having upper and lower operating cams, partially cut away.
Figure 14B:
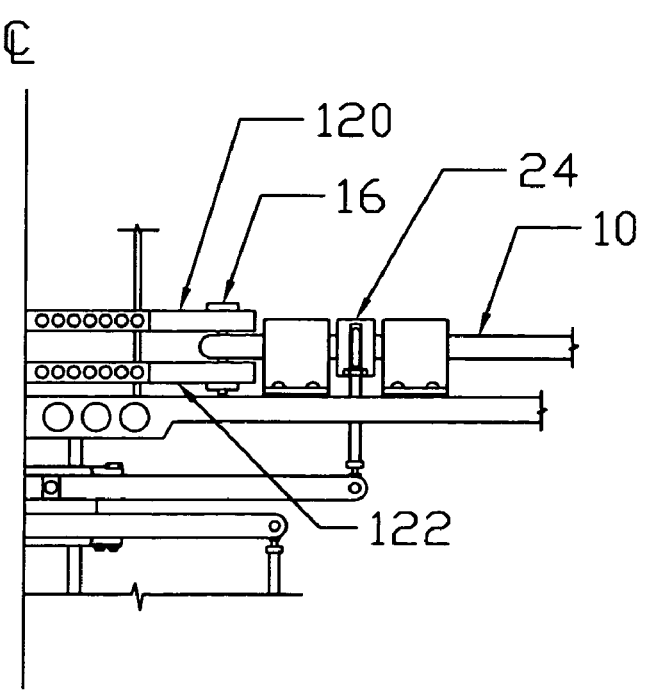

Instead of having one operating cam 6, a plurality may be used. One example is shown in FIG. 14. Upper operating cam 120 and lower operating cam 122 are depicted. Having upper and lower operating cams balances the forces on the pin riding in the cam groove, and connecting to the spar. The pitch horn 24 and spar guides 14 operate essentially as previously discussed. The slope or rake of the cam groove 8 could be shallow or steep, (for example as depicted at 8') depending on operational parameters and design choices. The drawing is a schematic, not to scale, and shows only one blade, but there may be a plurality of blades. The swash plate assembly, including the control rods, operates essentially the same as discussed previously.

FIG. 15 drawing depicts yet another embodiment, utilizing a drum or reel 124 to shorten the length of a cable 126 or flexible connecting element, whereby the spar 10 is drawn closer to the drum, shortening the effective length of the spar. The figure depicts a worm gear 128, operating the drum or reel 124, but other gear sets could be used, such as spur gears or crossed helical gears. Any type of servomechanism could be used, depending on design choices. The flexible cable could be a chain, steel cable, Kevlar belt or some composite material. Centrifugal force would pull the blade out as the drum or reel 124 is rotated in a direction to increase the length of the cable. The drawing is a schematic, not to scale, and shows only one blade, but there may be a plurality of blades.

The swash plate assembly, including the control rods, operates essentially the same as discussed previously. Spar guides 14 and a pitch control horn 24 operate in essentially the same way as discussed previously.

FIGS. 16 and 17 depict an embodiment of the disclosure that does not utilize cam grooves on the operating cam. A lobed operating cam 130 is attached to the rotor head assembly in the same manner as the operating cam 6. In this embodiment, the operating cam 130 includes a recess 142. Blade spars 10 are attached at their roots at each mounting hole 132 utilizing either a Lord type (rubber), steel uniball type or Teflon type mounting bearing 134 secured by a mounting bearing bolt 136 and positioned in recess 142, as depicted in FIG. 17E. This recess portion may also be formed by a double-layered lobed operating cam 130, having a lower layer or plate 131. This type of construction allows the blade spar 10 and blade 12 to rotate about their longitudinal axes as the pitch is changed by the pitch horn, which in FIGS. 16 and 17 is shown as control horn 138. The bearing 134 also allows the blade spar 10 to pivot around the bearing as the lobed operating cam 130 is rotated to retract or extend the blade spars 10 and blades 12, similarly to the operation of the mechanism shown in FIG. 12. FIG. 16 also depicts reference lines that show the change in angles of the blade spars and blades from the fully extended position 144 at 0° to a fully retracted position 146 at 18°.

The same type mounting bearing 134 may be used in conjunction with any pitch horn or control horn to permit relative rotational movement with the pitch control rods attached to the pitch horns or control horns. For example, a mounting bearing of the type 134 would be inserted into the control horn recess 140 of control horn 138. The mounting bearing would then be attached to a pitch control rod, allowing for horizontal as well as vertical movement as the blades 12 are retracted and extended.

FIG. 17A depicts a swiveling spar guide 148 having a square cross-section opening 150 to receive a similarly shaped blade spare 10. A control horn 138 (FIG. 17C) having a similarly shaped opening 152 is attached to the swiveling spar guide 148 with fixed length screws 154 which bottom out in screw mounts 156 in spar guide 148. Clearance can thereby be provided between spar guide 148 and control horn 138. Additionally, control horn 138 has arcuate through holes 158 through which the fixed length screws 154 are inserted and said screws then mounted in screw mounts 156. The clearances provided by this construction limit feed back to the aircraft controls, caused by blade flapping. The swiveling spar guide 148 includes a flexible insert, such as elastomeric insert 151, allowing pitch rotation of the spar 10. The elastomeric insert 151 is lined with a lining 20, as discussed previously. The swiveling spar guide 148 is attached to the rotor head 32 by a swivel assembly 160 that allows the spar guide 148 to rotate as the blade spar 10 is retracted and extended.

Figure 17D:
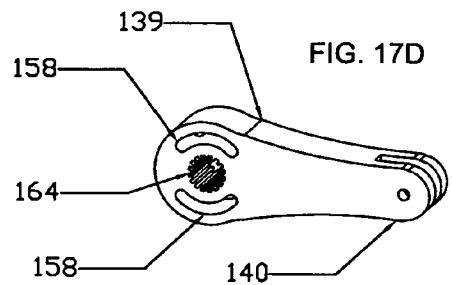
FIG. 17D Perspective view of an alternative embodiment of the pitch horn in FIG. 16.
Figure 17E:
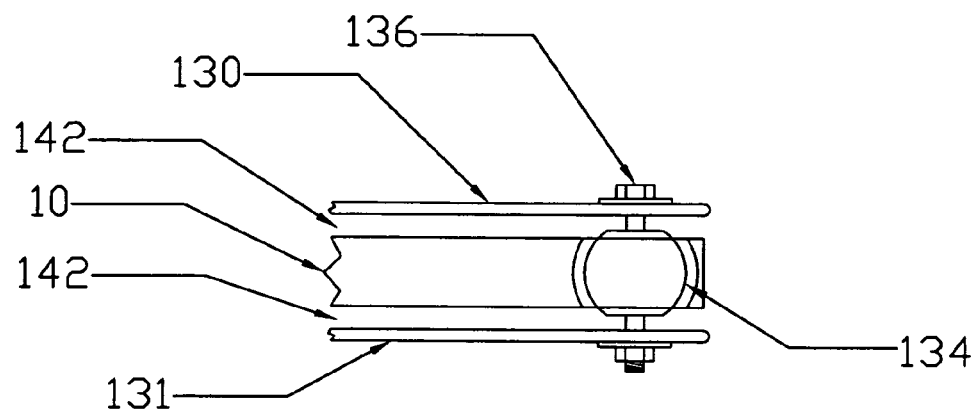
FIG. 17E Side view of the mounting of the blade anchor of FIG. 16.
Figure 17F:
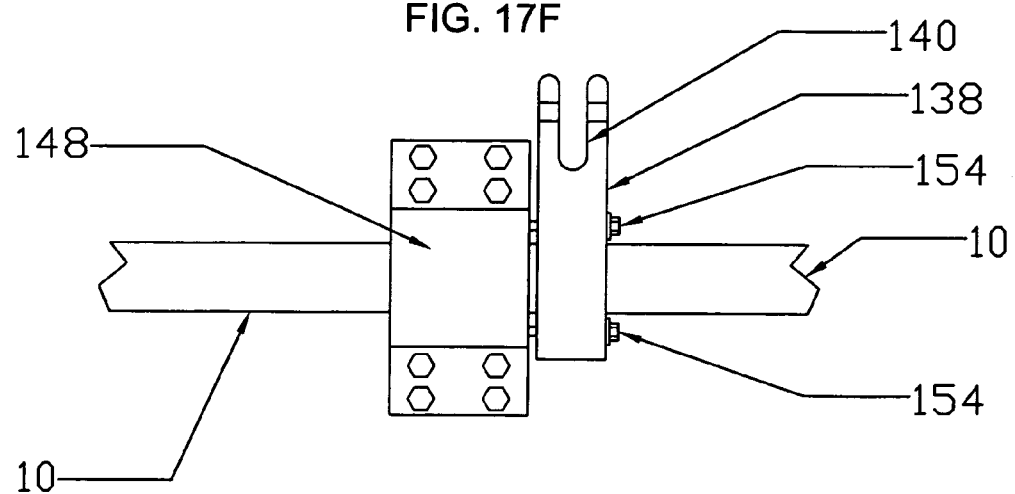

FIG. 17B is an alternative embodiment of the swiveling spar guide 148, the only difference being that the central opening is a splined opening 162, which would mate with a splined blade spar 10. It also includes an elastomeric insert 151 and a lining 21 that is defines the splines. A splined control horn 139 having a compatible splined control horn opening 164 is attached to the spar guide 148 (FIG. 17D).

It should be noted that the rotor head assembly 2 could be designed to extend and retract the blades 12 in a variety of ways. One way is straight out in and out from the center of rotation of the operating cam 6, as depicted in FIG. 1. The operating cam 6 may rotate either clockwise or counter clockwise. FIGS. 12 and 16 depict embodiments that sweep the blades 12 from a fully extended position to a retracted position as depicted in FIGS. 12 and 16. The blades 12 may be designed to sweep either forward or rearward in their flight paths. The final decision as to whether the rotation is clockwise or counter-clockwise for the rotor head assembly 2, and whether the blades sweep forward or rearward, or extend and retract along the radius line of the rotor head assembly 2, is directly connected to the shape, size, and weight of the host aircraft.

In the preferred embodiment, the rotor head is covered with a rotor head cover having an upper portion and a lower portion, which when assembled could provide an air-foil shape which reduces drag and could provide a lifting body for the aircraft. Examples of such completed assemblies can be seen in FIGS. 10 and 11. The embodiments show only a few examples of spar guides and pitch horns, but alternative designs may be employed. Other changes may be made to components of the system and would be expedient design modifications obvious to those skilled in the art.

The disclosure may also be utilized in a counter rotating system, which has two sets of rotating blades, one above the other, rotating in opposite directions. In this system the tail rotor is not required. Examples and embodiments of the disclosure as are set forth herein are illustrative and are not intended to be in any way limiting of the disclosure. The examples are not to be construed as limitations of the present disclosure since many variations thereof are possible without departing from its spirit and scope.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

I claim:

1. A rotor blade assembly for providing vertical lift to an aircraft comprising:
   a rotor head;
   an operating wheel rotatable around a central point, and rotatable relative the rotor head;
   a plurality of blades, each blade attached to the operating wheel, each blade comprising a blade spar;
   whereby movement of the operating wheel causes the radial distance between the distal tip of the attached blade and the center of the rotor head to alter;
   a pitch controller having an opening, said blade spar passing through the opening in a sliding fit, the pitch controller connected to a swash plate; and
   a first spherical bearing interacting between the pitch controller and the pitch control rod, the pitch control rod interacting between the pitch controller and the swash plate whereby the pitch controller controls the pitch of each blade spar.

2. The rotor blade assembly of claim 1 further comprising a second spherical bearing connecting the blade spar to the operating cam, whereby the blade spar may rotate along its longitudinal axis.

3. The rotor blade assembly of claim 1 wherein the pitch controller opening has an internal shape substantially matching the external shape of the blade spar.

4. The rotor blade assembly of claim 2 wherein the internal shape of the pitch controller opening is polygonal.

5. The rotor blade assembly of claim 2 wherein the internal shape of the pitch controller opening is splined.

6. The rotor blade assembly of claim 1 further comprising a swiveling connector connecting the spar guide to the rotor head, wherein the spar guide may swivel relative to the rotor head.

7. A rotor blade assembly for providing vertical lift to an aircraft comprising:
   a rotor head;
   a plurality of cam surfaces;
   a plurality of blades, each blade attached to a cam surface, each blade comprising a blade spar;
   whereby movement of a cam surface causes the radial distance between the distal tip of the attached blade and the center of the rotor head to alter;
   a pitch controller having an opening, said blade spar passing through the opening in a sliding fit, the pitch controller connected to a swash plate; and
   a spherical bearing interacting between the pitch controller and the pitch control rod, the pitch control rod interacting between the pitch controller and the swash plate whereby the pitch controller controls the pitch of each blade spar.

8. The rotor blade assembly of claim 7 further comprising a second spherical bearing connecting the blade spar to the operating cam, whereby the blade spar may rotate along its longitudinal axis.

9. The rotor blade assembly of claim 7 further comprising:
   a plurality of bladeletts positioned near the outer periphery of the rotor head;
   the bladeletts having a retracted position wherein substantially all portions of the bladeletts are within the outer periphery of the rotor head; and
   a bladelett control mechanism for imparting force to the bladeletts, wherein the imparted force moves a portion of one or more bladeletts beyond the periphery of the rotor head, whereby passing air impacts the moved one or more bladeletts exerting a pressure which causes rotational movement of the rotor blade assembly.

10. The rotor blade assembly of claim 8 wherein the bladelett control mechanism further comprises:
    an actuator; and
    an actuator cable attached to the actuator and one or more bladeletts, wherein energizing the actuator pulls the actuator cable whereby the actuator cable transmits force to the one or more bladeletts.

11. A rotor blade assembly for providing vertical lift to an aircraft comprising:
    a rotor head;
    one or more blades attached to the rotor head;
    a piston chamber at the proximal end of said one or more blades, nearest to the center of the rotor head;
    a spar guide on each blade;
    a piston on each spar guide cooperating with the piston chamber, whereby fluid is forced into one side of the piston chamber driving the associated blade hydraulically in one direction, and whereby fluid is forced into the other side of the piston chamber driving the associated blade in the other direction;
    a pitch controller having an opening, said blade spar passing through the opening in a sliding fit, the pitch controller connected to a swash plate; and
    a spherical bearing interacting between the pitch controller and the pitch control rod, the pitch control rod interacting between the pitch controller and the swash plate whereby the pitch controller controls the pitch of each blade spar.

12. The rotor blade assembly of claim 11 further comprising a second spherical bearing connecting the blade spar to the operating cam, whereby the blade spar may rotate along its longitudinal axis.

* * * * *